United States Patent
Tafazoli Bilandi et al.

(10) Patent No.: US 12,331,488 B2
(45) Date of Patent: Jun. 17, 2025

(54) METHOD, APPARATUS AND SYSTEM FOR MONITORING A CONDITION ASSOCIATED WITH OPERATING HEAVY EQUIPMENT SUCH AS A MINING SHOVEL OR EXCAVATOR

(71) Applicant: MOTION METRICS INTERNATIONAL CORP., Vancouver (CA)

(72) Inventors: Shahram Tafazoli Bilandi, Vancouver (CA); Mahdi Ramezani, Vancouver (CA); Saman Nouranian, Vancouver (CA); Kenneth Smith, Vancouver (CA); Sahar Ghavidel, Vancouver (CA); Mohammad Sameti, Coquitlam (CA)

(73) Assignee: MOTION METRICS INTERNATIONAL CORP., Vancouver (CA)

( * ) Notice: Subject to any disclaimer, the term of this patent is extended or adjusted under 35 U.S.C. 154(b) by 959 days.

(21) Appl. No.: 17/059,648

(22) PCT Filed: Jun. 1, 2018

(86) PCT No.: PCT/CA2018/000108
§ 371 (c)(1),
(2) Date: Nov. 30, 2020

(87) PCT Pub. No.: WO2019/227194
PCT Pub. Date: Dec. 5, 2019

(65) Prior Publication Data
US 2021/0262204 A1    Aug. 26, 2021

(51) Int. Cl.
G06N 3/082  (2023.01)
E02F 9/20   (2006.01)
E02F 9/26   (2006.01)
G06N 3/045  (2023.01)
G06T 7/00   (2017.01)

(52) U.S. Cl.
CPC .............. *E02F 9/261* (2013.01); *E02F 9/205* (2013.01); *G06N 3/045* (2023.01); *G06N 3/082* (2013.01); *G06T 7/0004* (2013.01); *G06T 2207/30164* (2013.01)

(58) Field of Classification Search
CPC ........ E02F 9/261; E02F 9/205; G06T 7/0004; G06T 2207/30164; G06N 3/082; G06N 3/045
See application file for complete search history.

(56) References Cited

U.S. PATENT DOCUMENTS

| | | | |
|---|---|---|---|
| 9,886,754 B2 | 2/2018 | Lim et al. | |
| 2017/0103506 A1* | 4/2017 | Dandibhotla | ....... G06F 18/2411 |
| 2017/0287124 A1* | 10/2017 | Lim | ........................... G06T 7/74 |
| 2018/0051446 A1* | 2/2018 | Yoshinada | .............. E02F 9/264 |

FOREIGN PATENT DOCUMENTS

| | | | |
|---|---|---|---|
| CA | 2781349 | 12/2012 | |
| CN | 107862675 A | * 3/2018 | ........... G06K 9/4604 |

(Continued)

OTHER PUBLICATIONS

Lim, Ser Nam, Joao Soares, and Ning Zhou. "Tooth guard: A vision system for detecting missing tooth in rope mine shovel." 2016 IEEE Winter Conference on Applications of Computer Vision (WACV). IEEE, 2016. (Year: 2016).*

Papadimitriou, S, European Patent Office, Extended European Search Report, in connection with related European Patent Application No. 18920710.3, dated Jan. 12, 2022, 9 pages.

(Continued)

*Primary Examiner* — Vu Le
*Assistant Examiner* — Tracy Mangialaschi
(74) *Attorney, Agent, or Firm* — Palmer Dzurella

(57) ABSTRACT

A computer processor implemented method and system for monitoring a condition associated with operating heavy equipment is disclosed. The method involves receiving a plurality of images at an interface of an embedded processor disposed on the heavy equipment, the images providing a (Continued)

view of at least an operating implement of the heavy equipment. The method also involves processing each of the plurality of images using a first neural network implemented on the embedded processor, the first neural network having been previously trained to identify regions of interest within the image. Each region of interest has an associated designation as at least one of a critical region suitable for extraction of critical operating condition information required for operation of the heavy equipment, and a non-critical region suitable for extraction of non-critical operating condition information associated with the operation of the heavy equipment. The method further involves causing the embedded processor to initiate further processing of image data associated with critical regions to generate local output operable to alert an operator of the heavy equipment of the associated critical operating condition. The method also involves transmitting image data associated with non-critical regions to a remote processor, the remote processor being operably configured for further processing of the image data and to generate output signals representing results of the further processing. The method further involves receiving the output signals generated by the remote processor at one of the embedded processor or another processor associated with a heavy equipment operations worksite, the output signals being presentable via an electronic user interface based at least in part on the output signals to indicate the results of the further processing.

29 Claims, 15 Drawing Sheets

(56) References Cited

FOREIGN PATENT DOCUMENTS

| EP | 1213394 A1 | 6/2002 | |
|---|---|---|---|
| WO | 2016183662 A1 | 11/2016 | |
| WO | WO-2016183661 A1 * | 11/2016 | ................ E02F 3/04 |
| WO | 2017100903 A1 | 6/2017 | |

OTHER PUBLICATIONS

International Search Report and Written Opinion of the International Searching Authority issued by the Canadian Intellectual Property Office in connection with International Patent Application No. PCT/CA2018/000108, dated Feb. 20, 2019, 6 pages.

* cited by examiner

METHOD, APPARATUS AND SYSTEM FOR MONITORING A CONDITION ASSOCIATED WITH OPERATING HEAVY EQUIPMENT SUCH AS A MINING SHOVEL OR EXCAVATOR

BACKGROUND

1. Field

This disclosure relates generally to operations of heavy equipment and more particularly to monitoring a condition associated with operating heavy equipment.

2. Description of Related Art

Heavy equipment such as mining shovels and excavators are used to load material such as ore, waste, or a combination thereof from a mine face into a haul truck or onto a conveyor for transportation to a processing location. Loading operations generally involve at least some element of danger as the payload being transferred may be heavy and could cause severe injury to operators involved in the loading operation. Accordingly, there exists a need to provide for efficient monitoring of loading operations by involved operators to ensure that safe loading practices are followed, and that any loading equipment malfunction or damage is quickly identified.

Mining shovels and excavators employ a ground engaging tool such as a bucket having components such as teeth, lip shrouds, adaptors, and wing shrouds that may become damaged or detached from the ground engaging tool. The payload may thus include undesired materials such as a detached tooth, detached adapter, detached lip shroud or large boulder(s) that should not be loaded. Such undesirable materials in the payload may potentially cause equipment damage either to the mining shovel or excavator or to the haul truck during loading or during later processing of the payload.

In mining operations, due to the large size and capital cost of equipment involved in loading mined ore, monitoring of loading operations is important. Open pit mines in particular employ extremely large mining shovels, backhoe excavators, or wheeled loaders for loading the payload into equally large haul trucks. In some examples of cable shovels, the bucket has capacity for loads of 150 tons or more.

There remains a need for methods and systems for monitoring loading operations to ensure safe and/or efficient operation of the involved equipment.

A detached tooth or adapter from a mining shovel or excavator bucket that goes undetected can either jam a downstream crusher or end up on conveyor belts for transporting payload. In both cases, this can bring the mining operation to a standstill and become a serious safety hazard. Removing a missing tooth from the crusher from within several tons of material is a dangerous task and injuries and fatalities have been reported by mines attempting to remove a detached objects from a crusher. Similarly, repair of conveyor belts torn by a detached bucket tooth is also a dangerous operation.

A large boulder in the bucket of the mining shovel or excavator causes similar concerns, since the boulder may damage the bucket components. Dropping a large boulder into a haul trucks may cause the truck to be severely jolted, potentially damaging the truck and/or causing injuries to the truck operator. Large boulders may also block a downstream crusher and require application of tools such as a hydraulic hammer to fragment the bolder. Portions of jammed bolder may also become dangerous projectiles that may impact portions of the crusher such as the operator enclosure.

SUMMARY

In accordance with one disclosed aspect there is provided a computer processor implemented method for monitoring a condition associated with operating heavy equipment. The method involves receiving a plurality of images at an interface of an embedded processor disposed on the heavy equipment, the images providing a view of at least an operating implement of the heavy equipment. The method also involves processing each of the plurality of images using a first neural network implemented on the embedded processor, the first neural network having been previously trained to identify regions of interest within the image. Each region of interest has an associated designation as at least one of a critical region suitable for extraction of critical operating condition information required for operation of the heavy equipment, and a non-critical region suitable for extraction of non-critical operating condition information associated with the operation of the heavy equipment. The method further involves causing the embedded processor to initiate further processing of image data associated with critical regions to generate local output operable to alert an operator of the heavy equipment of the associated critical operating condition. The method also involves transmitting image data associated with non-critical regions to a remote processor, the remote processor being operably configured for further processing of the image data and to generate output signals representing results of the further processing. The method further involves receiving the output signals generated by the remote processor at one of the embedded processor or another processor associated with a heavy equipment operations worksite, the output signals being presentable via an electronic user interface based at least in part on the output signals to indicate the results of the further processing.

For'each region of interest, the first neural network may be operably configured to produce a probability map including a probability of each image pixel or group of pixels in the image being associated with a particular region of interest and may further involve causing the embedded processor to perform a correlation between the probability map and a template associated with the particular region of interest, the template including information based on a physical extent and shape of an object within the region of interest, and in response to determining that the correlation between the probability map and the template meets a criterion, causing the embedded processor to identify a portion of the image corresponding to the template for further processing.

Determining that the correlation between the probability map and the template meets a criterion may involve selecting successive portions of the probability map based on the template, computing a correlation value for each successive portion, and identifying the portion of the image for further processing based on identifying one of the successive portions of the probability map that has a maximum correlation value that also meets the correlation criterion.

The method may involve training the first neural network to identify regions of interest by (a) performing a first training of a neural network having a first plurality of interconnected neurons using a first plurality of labeled images of critical regions and non-critical regions, each neuron having a respective weighting, (b) evaluating performance of the neural network based on results obtained for processing of a second plurality of labeled images, (c) pruning neurons having a weighting below a pruning threshold to produce a pruned neural network having a second plurality of interconnected neurons, (d) re-evaluating the performance of the pruned neural network having the second plurality of interconnected neurons based on results obtained for processing the second plurality of labeled images, (e) repeating (c) and (d) while pruning neurons has an acceptable effect on the performance of the neural network, the pruned network having the reduced number of neurons being used to implement the first neural network on the embedded processor.

Evaluating performance of the neural network and re-evaluating performance of the pruned neural network may be based on computing a cost function that accounts for increased processing speed of the pruned neural network and reduced accuracy in producing the labeled result associated with the previously labeled training images.

Processing each of the plurality of images may involve processing the images to identify as a critical region, one of a wear part region of the operating implement for performing missing wear part detection, and a payload region within the operating implement for performing boulder detection.

Processing each of the plurality of images may involve processing the images to identify as a non-critical region, one of a wear part region of the operating implement for determining a wear rate associated with a wear part, a payload region within the operating implement for performing fragmentation analysis on the payload, and a bucket region of the operating implement for determining a bucket fill proportion.

Receiving the plurality of images may involve receiving a plurality of images providing a view of the operating implement and an area surrounding the operating implement and processing each of the plurality of images may involve processing the images to identify as a critical region, one of a vehicle appearing within the image at a location designated as a danger zone, and a component associated with manipulation of the operating implement appearing outside of an operational zone associated with the operating implement.

Causing the embedded processor to process images identified as being suitable for extraction of critical operating condition information may involve processing the identified images using a second neural network that has been previously trained to extract the critical operating condition information from the region of interest.

Processing the identified images using a second neural network may involve processing the identified images using a convolutional neural network having a sparse kernel.

Processing each of the plurality of images may involve processing the images to identify a wear part region of the operating implement as a critical region and causing the embedded processor to initiate further processing may involve causing the embedded processor to process image data corresponding to the wear part region using a second neural network that has been previously trained to identify wear components of the wear part.

The second neural network may be operably configured to produce a probability map including a probability of each image pixel or group of pixels in the image being associated with a wear component and may further involve causing the embedded processor to perform a correlation between the probability map and a wear component template including information based on a physical extent and shape of the wear component, and in response to determining that the correlation between the probability map and the wear component template meets a criterion, causing the embedded processor to identify individual wear components of the wear part.

The method may involve causing the embedded processor to locate a tracking feature associated with each identified wear component in the image data and may further involve causing the embedded processor to issue a missing wear component alert when the tracking feature changes location between subsequent images by more than a missing wear component threshold.

The wear part may include a toothline and the wear components may include respective teeth in the toothline and the tracking feature may include a tip of respective teeth.

The method may involve causing the embedded processor to identify a reference tooth within the plurality of teeth and to generate a tracking feature trajectory for the reference tooth over successive images in the plurality of images, determine conformance of the tracking feature trajectory between successive images to validate identification of the reference tooth, and in response to validating identification of the reference tooth in an image, identifying remaining teeth in the image relative to the reference tooth to uniquely identify each tooth in the image, and causing the embedded processor to issue a missing tooth alert may involve causing the embedded processor to issue a missing tooth alert uniquely identifying the tooth associated with the tracking feature change in location by more than the missing tooth threshold.

The method may involve causing the embedded processor to save location information associated with the tracking feature and causing the embedded processor to issue a missing tooth alert may involve causing the embedded processor to issue a missing tooth alert in response to determining that the tracking feature has changed location by more than the missing tooth threshold in successive images.

The method may involve causing the embedded processor to save location information associated with the tracking feature and in response to determining that the tracking feature trajectory in successive images has changed location by less than the missing tooth threshold, updating the saved location information based on the changed location.

Processing each of the plurality of images may involve causing the embedded processor to process images to identify regions meeting a criterion for successful determination of wear status of the wear part of the operating implement as non-critical regions and transmitting image data corresponding to the identified regions to the remote processor for further processing to monitor a wear rate of the wear part.

Causing the embedded processor to transmit selected images may involve causing the embedded processor to use a neural network that has been previously trained to assign a probability to pixels in the image including a wear landmark, a generally contiguous group of pixels having a higher assigned probability being indicative of the group of pixels being associated with the wear landmark, and determine that the criterion for successful determination of wear status of the wear part may be met when an image includes a minimum number of groups of pixels having high probability of including a wear landmark.

The wear part may involve a toothline having a plurality of teeth and may further involve causing the remote processor to further process images transmitted by the embedded processor by processing the images using a neural network that has been previously trained to assign a probability to pixels in the image including wear landmarks, a generally contiguous group of pixels having a higher assigned probability being indicative of the group of pixels being associated with the wear landmark, and processing selected images using a second neural network that has been previously trained to assign a probability to pixels in the image being associated with a tooth, a generally contiguous group of pixels having a higher assigned probability being indicative of the group of pixels being associated with the tooth.

The further processing may further involve generating at least one of a wear rate, wear pattern, and an estimated service life time for each tooth in the plurality of teeth by determining tooth condition as a function of operating time of the heavy equipment.

The further processing may further involve generating a confidence level associated with each tooth condition determined during the further processing, the confidence level being based on a number of wear landmarks associated with the tooth that are identified in the image.

The wear landmark may involve a portion of the operating implement that wears at a lesser rate during operation of the heavy equipment than the plurality of teeth.

Receiving the plurality of images may involve receiving images from one of an image sensor having primary sensitivity to visible wavelengths, and an image sensor having sensitivity to infrared wavelengths.

Receiving the plurality of images may involve receiving images from pair of spaced apart image sensors operable to generate three-dimensional information representing objects within view of the image sensors.

Processing the plurality of images may involve processing the images to determine three-dimensional depth information associated with pixels in the images and identifying of regions of interest may be based on the three-dimensional depth information.

Transmitting image data to the remote processor may involve transmitting three-dimensional image data to the remote processor for use in determining sizing of objects within view of the image sensors.

Processing each of the plurality of images may involve causing the embedded processor to select images from the plurality of images using the first neural network that has been previously trained to assign a probability to pixels in the image being associated with a payload carrying operating implement, the selected images being selected based on inclusion of a generally contiguous region having a higher assigned probability indicative of a payload, the selected images being representative of movement of the operating implement while performing a loading operation, processing the images to distinguish the payload from a background region in the image by processing successive images to identify static image portions that remain substantially unchanged between successive images, the static image portions having a higher likelihood of being associated with the payload, and wherein transmitting image data associated with non-critical regions to a remote processor involves selecting at least one suitable image and transmitting the selected image to the remote processor for further processing at the remote processor using a second neural network to identify fragmented material portions of the payload within the static image portions.

In accordance with another disclosed aspect there is provided a system for monitoring a condition associated with operating heavy equipment. The system includes an embedded processor disposed on the heavy equipment having an interface for receiving a plurality of images, the images providing a view of at least an operating implement of the heavy equipment. The embedded processor is operably configured to process each of the plurality of images using a first neural network, the first neural network having been previously trained to identify regions of interest within the image, each region of interest having an associated designation as at least one of critical regions suitable for extraction of critical operating condition information required for operation of the heavy equipment, and non-critical regions suitable for extraction of non-critical operating condition information associated with the operation of the heavy equipment. The embedded processor is operably configured to initiate further processing of image data associated with critical regions to generate local output operable to alert an operator of the heavy equipment of the associated critical operating condition. The system also includes a transmitter in communication with the embedded processor and being operably configured to transmit image data associated with non-critical regions to a remote processor. The remote processor is operably configured for further processing of the image data and to generate output signals representing results of the further processing, and output signals generated by the remote processor are received at one of the embedded processor or another processor associated with a heavy equipment operations worksite, the output signals being presentable via an electronic user interface based at least in part on the output signals to indicate the results of the further processing.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
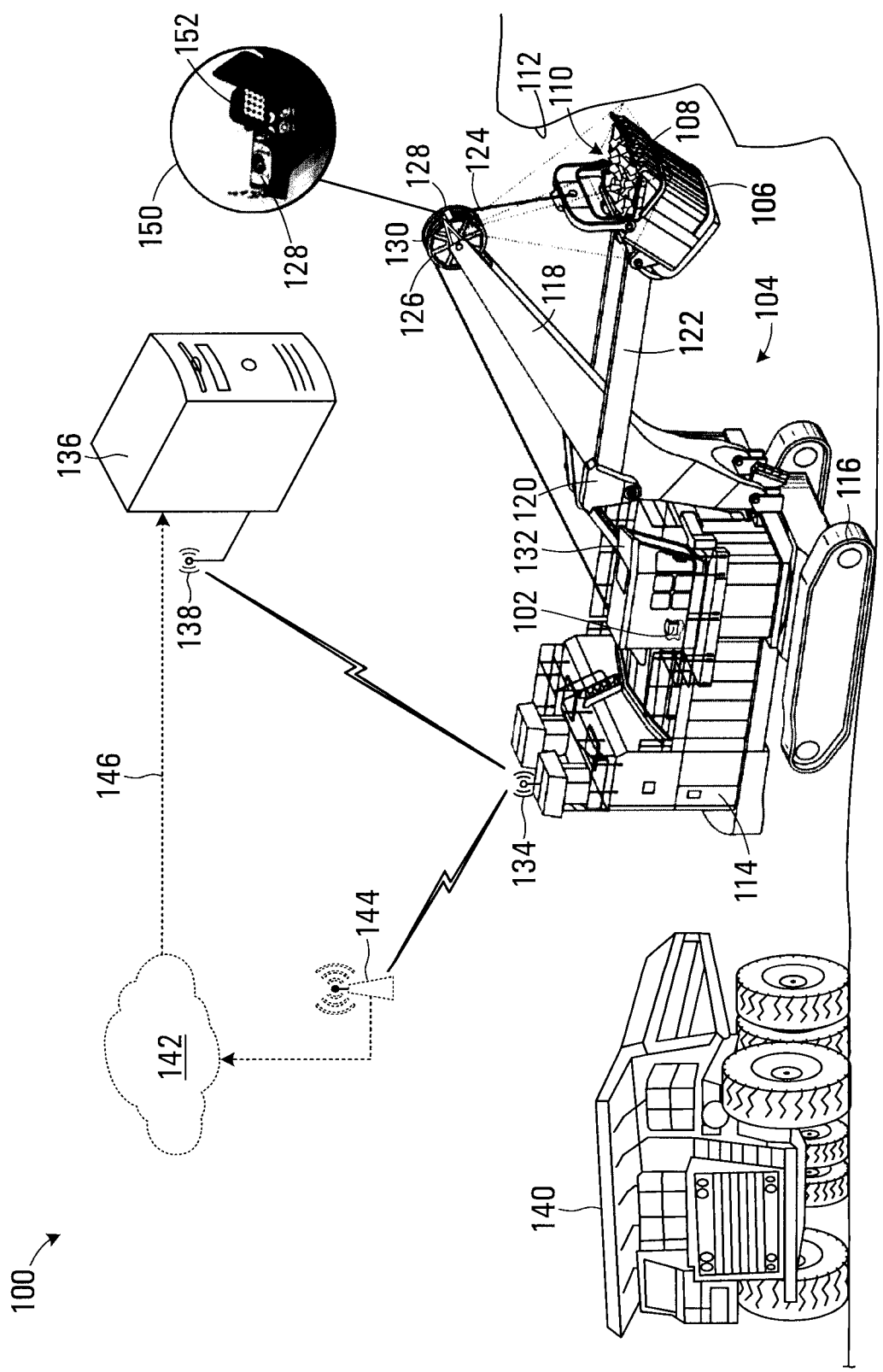
FIG. 1A is a perspective view of a system for monitoring a condition associated with operating a mining shovel to excavate a mine face, in accordance with one disclosed embodiment.

Referring to FIG. 1A, a system for monitoring a condition associated with operating heavy equipment is shown at 100. The monitoring system 100 includes an embedded processor 102 disposed on the heavy equipment, in this case a mining shovel 104. The mining shovel 104 has an operating implement 106 including a plurality of ground engaging teeth 108 (toothline) for excavating ore and loading a payload 110 from a mine face 112 in an open pit mine. In other embodiments, the heavy equipment may be a dragline shovel, backhoe excavator, wheel loader, or any other load transfer device coupled to various types of loading machinery for loading a payload. In this embodiment the payload comprises excavated ore inside the bucket of the mining shovel 104, but other embodiments may handle different payload materials.

The mining shovel 104 includes a housing 114 mounted for rotation of a crawler track 116. The mining shovel 104 has a boom 118 mounted on the housing 114 and a saddle block 120 carried on the boom. The saddle block 120 receives a crowd 122, having the operating implement 106 pivotably mounted to an end of the crowd 122. A hoist cable 124 runs between the operating implement 106, over a pulley 126, and is received on a winch drum (not shown) within a housing of the mining shovel 104. The saddle block 120 is configured to permit the crowd 122 to pivot about the saddle block when the hoist cable 124 is extended or retracted. The saddle block 120 also permits the crowd 122 to extend and retract to position the operating implement 106 for excavating the mine face 112.

The embedded processor 102 includes an interface (not shown) for receiving a plurality of images, the images providing a view of at least the operating implement 106 of the heavy equipment. In the embodiment shown the mining shovel 104 includes an image sensor 128 mounted via a bracket 130 on the boom 118 of the mining shovel. The image sensor 128 is shown in more detail in an insert 150, and in this embodiment includes an illuminator 152 for illuminating a field of view of the camera. In the embodiment shown the image sensor 128 is disposed to capture images of the operating implement 106, but the field of view of the image sensor may be selected to also capture other components associated with manipulation of the operating implement 106, such as the hoist cable 124 and a surrounding environment. In the embodiment shown, a haul truck 140 is positioned to receive the payload 110 excavated by the mining shovel 104.

The mining shovel 104 also includes a transmitter 134 controlled by the embedded processor 102 and the system 100 further includes a remote a remote processor 136 having a transceiver 138 for receiving data transmitted by the transmitter 134 on the mining shovel 104. Alternatively, the transmitter 134 on the mining shovel 104 may be configured to connect to a wide area network 142 for transmitting the image data associated with non-critical regions to the remote processor 136. The connection to the internet may be over a cellular data network or the transmitter 134 may be configured to connect to a wireless access point disposed proximate the mine face 112. The remote processor 136 may be connected to the wide area network 142 via a wired connection 146 or via the transceiver 138.

Figure 1B:
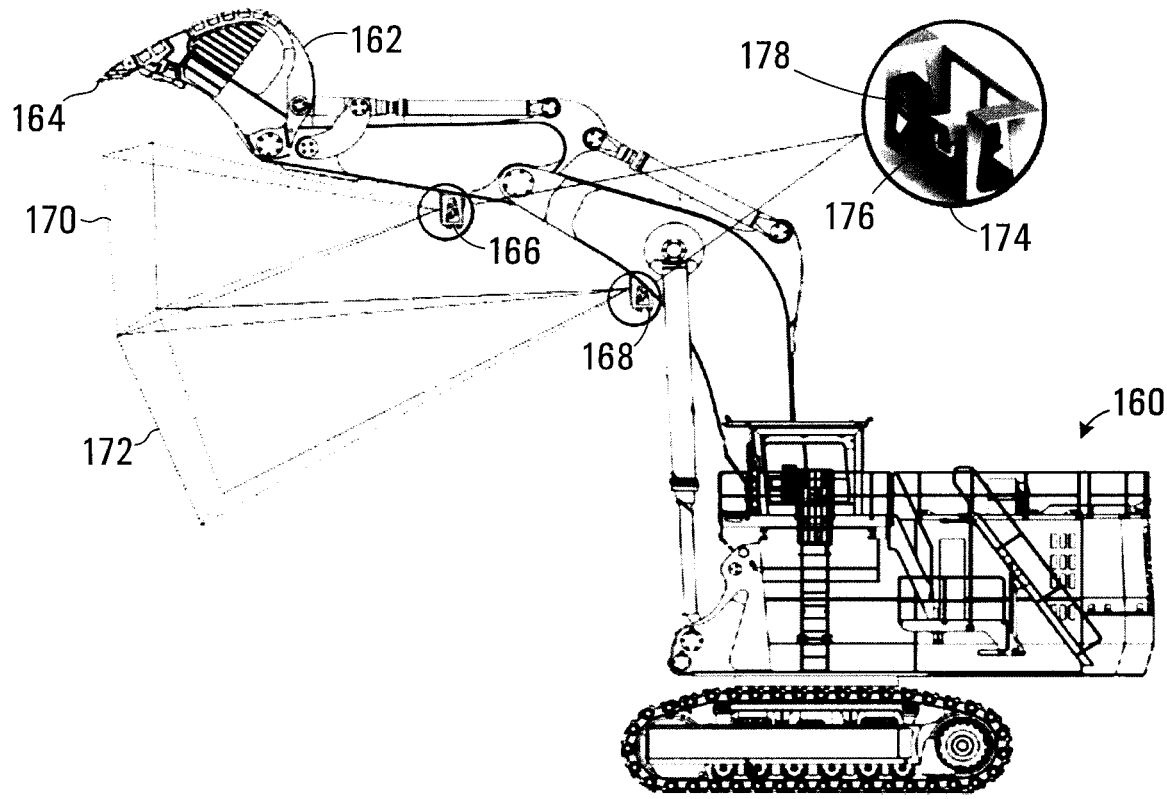
FIG. 1B, 1C are perspective views of a backhoe excavator and hydraulic face shovel in accordance with another disclosed embodiment.

Referring to FIG. 1B, a similar sensor to the image sensor 128 may be installed on other heavy equipment, such as the backhoe excavator shown at 160. The backhoe 160 includes an excavator bucket 162 having teeth 164. In the embodiment shown two possible locations for the image sensor are shown at 166 and 168, each having a respective field of view 170 and 172. The image sensors 166 and 168 are shown in more detail in an insert 174 and in this embodiment each include a visible spectrum image sensor 176 and an illumination source 178 for illuminating the field of view 170 or 172.

Figure 1C:
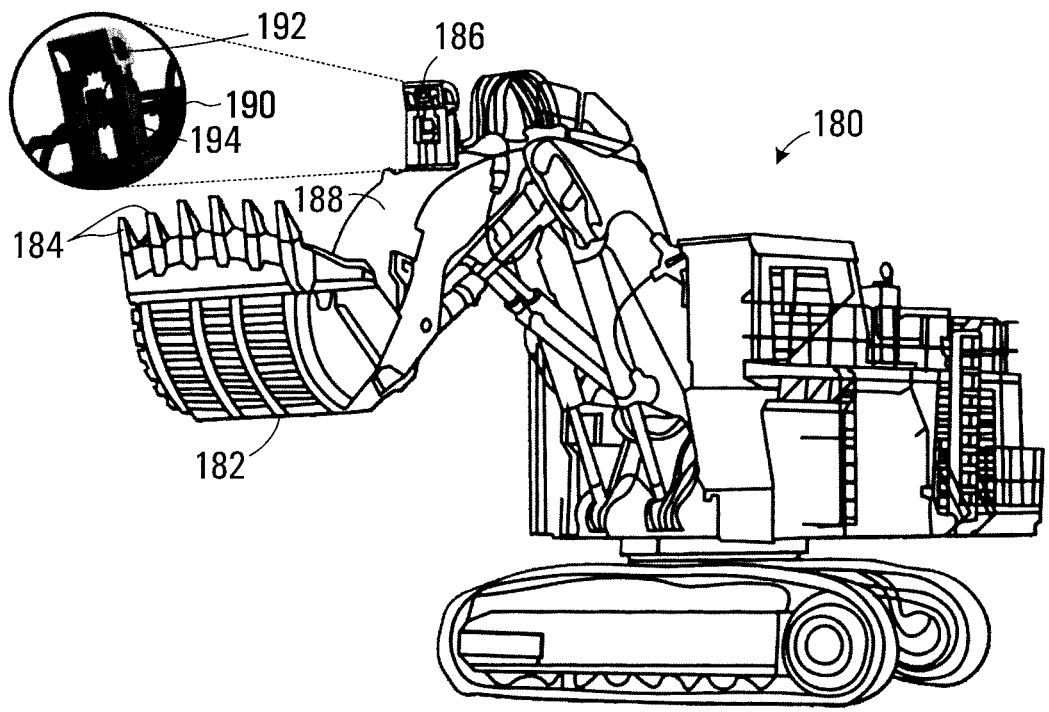

Referring to FIG. 1C a similar sensor to the sensor 102 may alternatively be installed on a hydraulic face shovel shown at 180, which includes an excavator bucket 182 having teeth 184. An image sensor 186 is installed on a linkage 188 that supports the excavator bucket 182. The image sensor 186 is shown in more detail in the insert 190 and includes a visible spectrum image sensor 192 and an illumination source 194 for illuminating the excavator bucket 182.

Embedded Processor Circuit

Figure 2A:
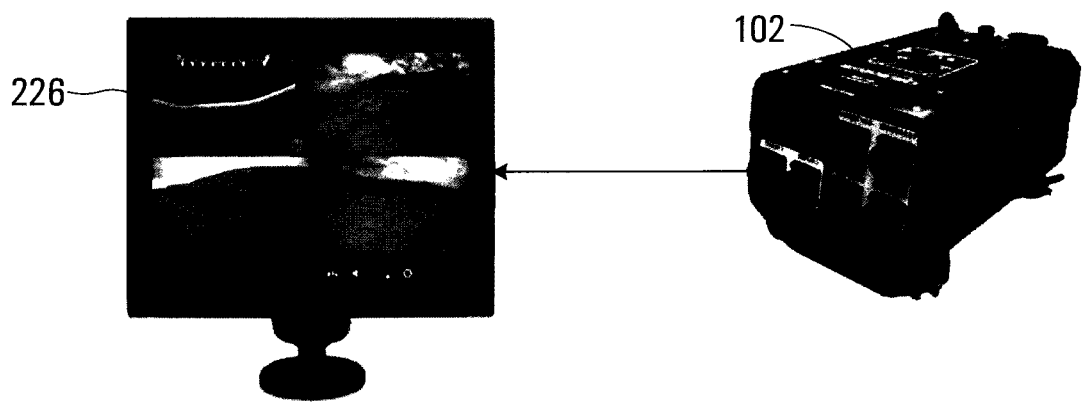
FIG. 2A is a perspective view of a processor circuit and display of the system shown in FIG. 1A.

In one embodiment the embedded processor 102 may be implemented using a ruggedized industrial processor circuit, such as shown in FIG. 2A. The embedded processor 102 is connected to a display 226, which may be disposed within a cab 132 of the mining shovel 104 for viewing by an operator of the mining shovel.

Figure 2B:
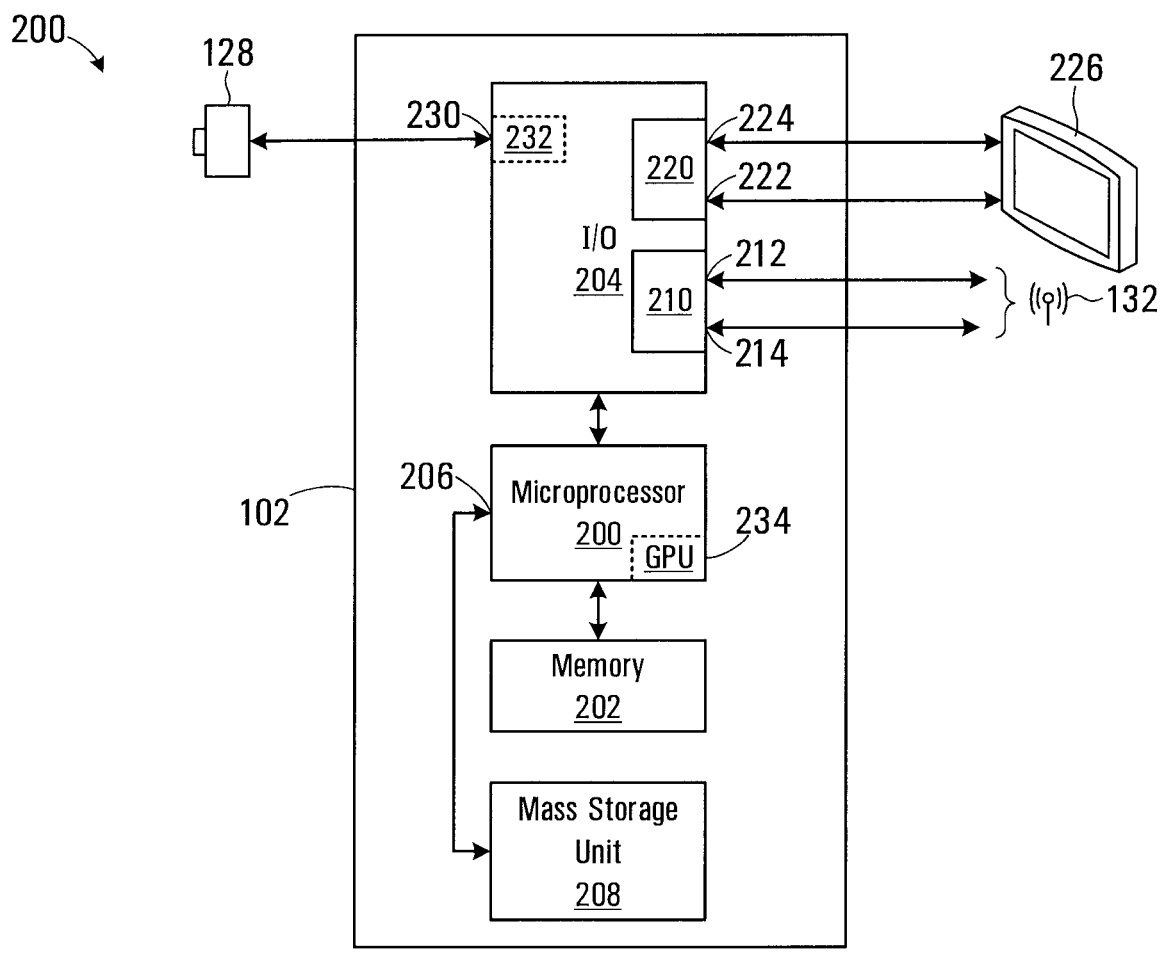
FIG. 2B is a block diagram of the processor circuit used in implementing the monitoring system shown in FIG. 1A.

A block diagram of the embedded processor 102 is shown in FIG. 2B. Referring to FIG. 2B, the embedded processor 102 includes a microprocessor 200, a memory 202, and an input output port (I/O) 204, all of which are in communication with the microprocessor 200. In one embodiment the embedded processor 102 may be optimized to perform image processing functions by including a graphics processing unit 234 (GPU) for accelerating image processing tasks carried out by the processor circuit. In other embodiments (not shown), the embedded processor 102 may be partly or fully implemented using a hardware logic circuit including discrete logic circuits and/or an application specific integrated circuit (ASIC), for example.

The microprocessor 200 also includes an interface port 206 (such as a SATA interface port) for connecting a mass storage unit 208 such as a hard drive or solid state drive. Program codes for directing the microprocessor 200 to carry out functions related to monitoring conditions associated with the mining shovel 104 may be stored in the memory 202 or the mass storage unit 208.

The I/O 204 may also include an interface 210 having ports 212 and 214 for connecting to the transmitter 134. In one embodiment the mining shovel 104 may have a local wireless network implemented on the shovel and the port 212 may be a Wi-Fi port implementing a wireless communications protocol such as the IEEE 802.11 protocol for communicating over the local network. In other embodiments, a wired network such as an Ethernet network may be implemented and the port 214 may be implemented as an Ethernet port for connecting to the local network. The transmitter 134 may also be connected wirelessly or by wired connection to the local network on the mining shovel 104. Program codes may be loaded into the memory 202 or mass storage unit 208 via the interface 210.

The I/O 204 also includes an interface 220 having an output 222 for producing display signals for driving the display 226. In one embodiment the display 226 may be implemented as a touchscreen display and the interface 220 may also include a USB port 224 in communication with a touchscreen interface of the display for receiving input from an operator. The I/O 204 may also have additional USB ports (not shown) for connecting a keyboard and/or other peripheral interface devices.

The I/O 204 further includes an image signal input port 230 for receiving image signals from the image sensor 128. In one embodiment the image sensor 128 may be a digital camera and the image signal port 230 may be an IEEE 1394 (firewire) port, USB port, or other suitable port for receiving image signals. In other embodiments, the image sensor 128 may be an analog camera that produces NTSC or PAL video signals, for example, and the image signal port 230 may be an analog input of a framegrabber interface 232. The image sensor 128 may be sensitive to a specific range of wavelengths, for example visible wavelengths and/or infrared wavelengths. Sensing infrared wavelengths may be advantageous in cases where there may be a temperature difference between regions of interest. For example the toothline region generally has an elevated temperature due to engagement with ore while excavating the mine face 112.

The image sensor 128 may thus be implemented using monochrome or color sensors, which would likely require a light source for illumination of the scene at nighttime or in low light conditions. Alternatively, the image sensor 128 may be implemented using IR (thermal) or near infrared (NIR) sensors, which are sensitive to the temperature of the operating implement 106 components. For example the ground engaging teeth 108 generally become hot during excavation causing the teeth to have greater pixel intensity in captured images. Thermal imaging also has the advantage of possibly eliminating the need for additional illumination.

Figure 18:
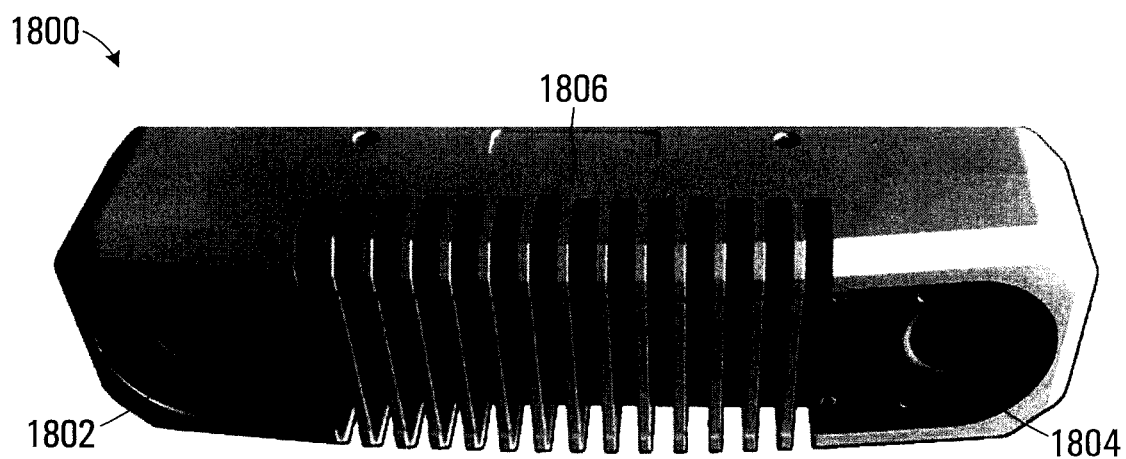
FIG. 18 is a perspective view of a ruggedized stereoscopic camera.

In some embodiments, the image sensor 128 may be implemented as a stereoscopic camera capable of using stereo-imaging to obtain a 3D point cloud of the scene. An example of a ruggedized stereoscopic camera is shown in FIG. 18 at 1800. The stereoscopic camera 1800 includes a first imager 1802 and a second imager 1804 mounted spaced apart within a ruggedized housing 1806. Each imager 1802 and 1804 captures images from a different perspective viewpoint. By processing pixels associated with an object taken from the two differing viewpoints, three-dimensional coordinates may be calculated for objects within view such as boulders, teeth, and other objects. The three-dimensional coordinates have the advantage of providing sizing and depth information associated with regions of interest. For example, a difference between depth values associated with ore loaded in the operating implement and ore in the mine face 112 may be used to separate the two bodies of ore, thus facilitating further analysis of the payload. Similarly, three-dimensional coordinates of the ground engaging teeth 108 on the operating implement 106 may be used to determine whether the tooth is damaged or missing, as well as a wear rate of the tooth based on the three-dimensional information. Three-dimensional coordinates may further be used to size boulders and fragments of ore.

Process for Monitoring Operating Conditions

Figure 3:
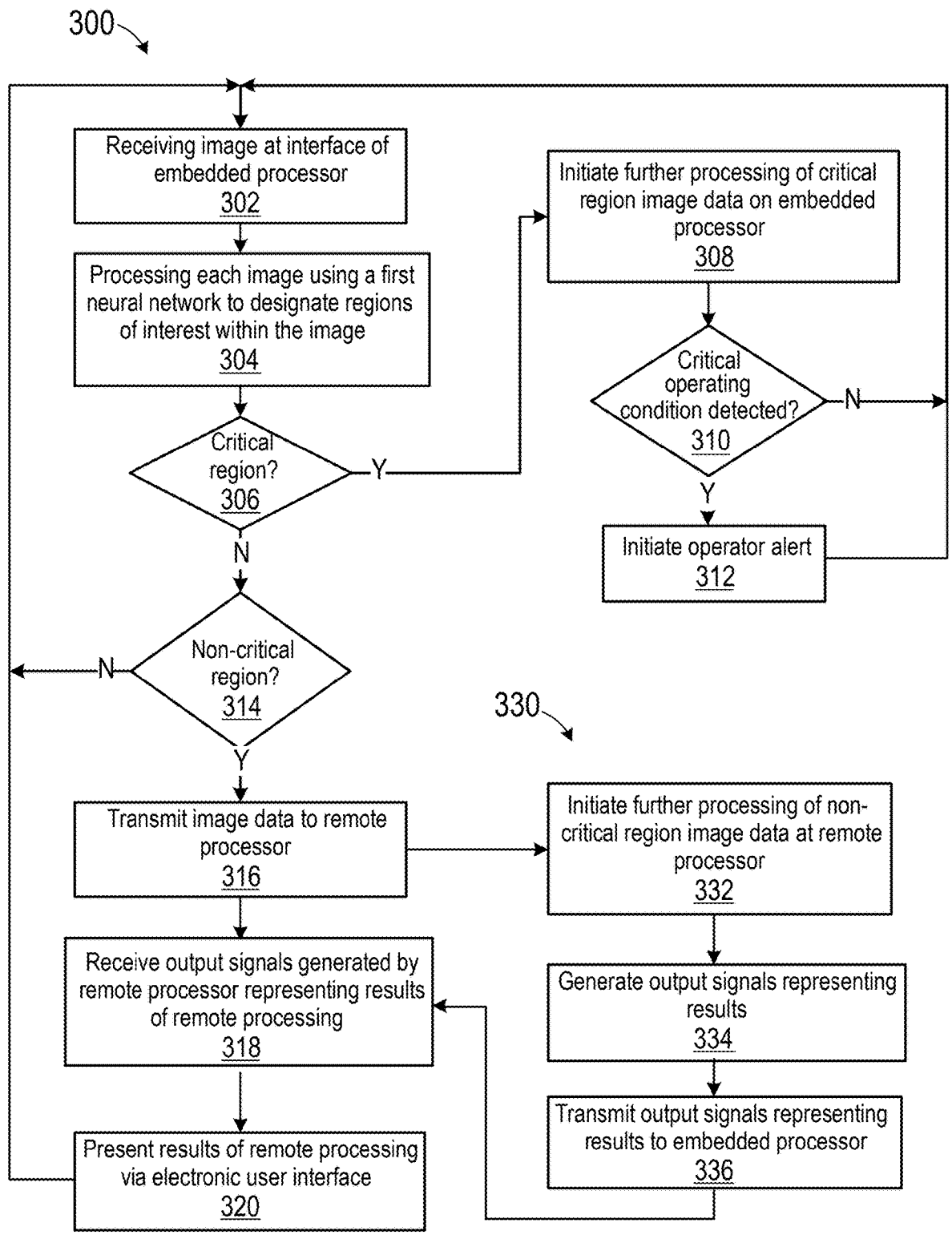
FIG. 3 is a process flowchart including blocks of codes for directing the processor circuit of the embedded processor to monitor operating conditions of the mining shovel shown in FIG. 1.

Referring to FIG. 3, a flowchart depicting blocks of code for directing the embedded processor 102 to monitor operating conditions of the mining shovel 104 is shown generally at 300. The blocks generally represent codes that may be loaded into the memory 202 or mass storage unit 208 via the interface 210 for directing the microprocessor 200 to perform various functions related to monitoring of the operating conditions. The actual code to implement each block may be written in any suitable program language, such as C, C++, C#, Java, and/or assembly code, for example.

The process begins at block 302, which directs the microprocessor 200 to receive each of a plurality of images at the image signal port 230 of the embedded processor 102. Block 304 then directs the microprocessor 200 to process each of the plurality of images using a first neural network to identify regions of interest within the image. The first neural network will have been previously trained to identify various regions of interest within each image.

Figure 4:
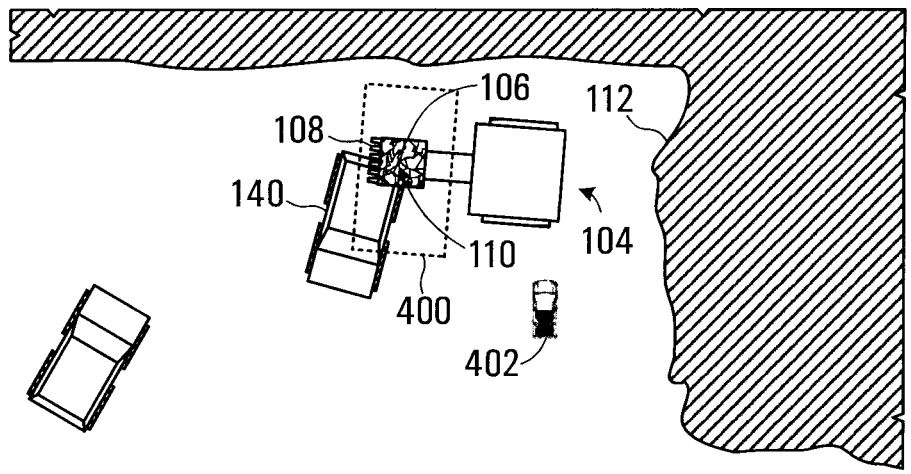
FIG. 4 is a plan view of the mine face shown in FIG. 1A.

As an example, referring to FIG. 4 the mine face 112, the mining shovel 104 and the haul truck 140 are shown in plan view. The mining shovel 104 is in the process of rotating towards the haul truck 140 to transfer the payload 110 to the haul truck. Under these conditions, the image sensor 128 may capture an image as indicated by the broken line 400 in FIG. 4. The image would thus include image features such as the operating implement 106, payload 110, the toothline 108 on the operating implement, a portion of the haul truck 140, and ground portions between the mining shovel 104 and the haul truck. The first neural network implemented on the embedded processor 102 may thus be trained to identify each of these image features in an image. Training of the neural network is described in more detail below, but generally involves configuring the neural network based on results generated by the network for a set of labeled training images in which the above image features have been identified.

Each identified region of interest also has an associated designation as being a critical region and/or non-critical region. Critical regions are designated as being suitable for extraction of critical operating condition information required for operation of the heavy equipment. For example, detection of a missing tooth is generally considered as a critical operating condition since a detached tooth may end up being integrated in the payload 110 and thus transferred to the haul truck 140. Subsequent processing by equipment having rollers for crushing the ore in the transferred payload 110 may be damaged by the tooth leading to downtime. Another critical operating condition may be the presence of a boulder or oversize rock in the payload 110 that is too large for processing and may cause similar damage and/or downtime. For example, oversized rocks frequently cause jams and bottlenecks during a crushing phase of subsequent processing. Designating boulder regions of interest as critical regions serves to provide a timely alert to the operator of the mining shovel 104. The operator may then decide whether to proceed with loading the payload 110 including the boulder or to discard the payload. Examples of other critical operating conditions may be the presence of an unexpected vehicle such as a pick-up truck 402 within the operating ambit of the mining shovel 104. Accordingly, the first neural network may also be trained to identify vehicles or parts of a vehicle and designate these as a critical region.

Non-critical regions of interest may be identified and used to extract non-critical operating condition information associated with the operation of the heavy equipment. For example, a fill proportion of the operating implement 106 for each payload 110, degree of fragmentation of the payload, and wear monitoring of the teeth in the toothline 108, are important operating parameters by are not critical for current operation of the mining shovel 104. Rather such information may be generated and used over time to assess and provide feedback for the operator of the mining shovel 104 and/or other mine personnel concerned with the efficiency of excavation operations. In some cases, the same region of interest may be designated as both a critical and non-critical region. For example, the toothline 108 of the operating implement 106 will be designated as a critical region for missing tooth detection purposes, but may also be designated as a non-critical region that includes information related to tooth wear monitoring.

The process 300 then continues at block 306, which directs the microprocessor 200 to determine whether an identified region of interest is designated as a critical region, in which case the microprocessor is directed to block 308. Block 308 directs the microprocessor 200 of the embedded processor 102 to initiate further processing of the image data associated with the region of interest to extract critical operating condition information. For example, the microprocessor 200 may perform missing tooth detection on the toothline 108 to determine whether all teeth are present in the image data.

The process 300 then continues at block 310, which directs the microprocessor 200 to determine whether following the further processing a critical operating condition, such as a missing tooth, has been detected. In some embodiments a plurality of successive images in which critical regions have been identified may be processed to evaluate whether the critical operating condition is present. For example while the operating implement 106 is excavating the mine face 112 as shown in FIG. 1, the likelihood of one of the teeth in the toothline 108 becoming detached is greater than when the mining shovel 104 is transferring the payload 110 to the haul truck 140. However during excavating the teeth may become partly obscured for a time and not all images will thus be suitable for extraction of the critical operating condition. In one embodiment block 310 directs the microprocessor 200 to determine whether the critical operating condition is consistently detected in successive images before making a final determination.

If a critical operating condition is detected at block 310 then the microprocessor 200 is directed to block 312, which directs the microprocessor 200 to initiate an operator alert. The operator alert may take the form of a displayed warning on the display 226 and/or warning sound within the cab 132 of the mining shovel 104. If no critical operating condition is detected at block 310, the microprocessor 200 is directed back to block 302 to process the next image or series of images.

At block 306, if it is determined that an identified region of interest is not designated as a critical region, the microprocessor is directed to block 314. Block 314 directs the microprocessor 200 to determine whether the identified region is a non-critical region, in which case the microprocessor is directed to block 316. Block 316 directs the microprocessor 200 to cause the interface 210 to transmit data associated with the non-critical region of interest via the transmitter 134 to the remote processor 136.

Remote Processor Circuit

Figure 5:
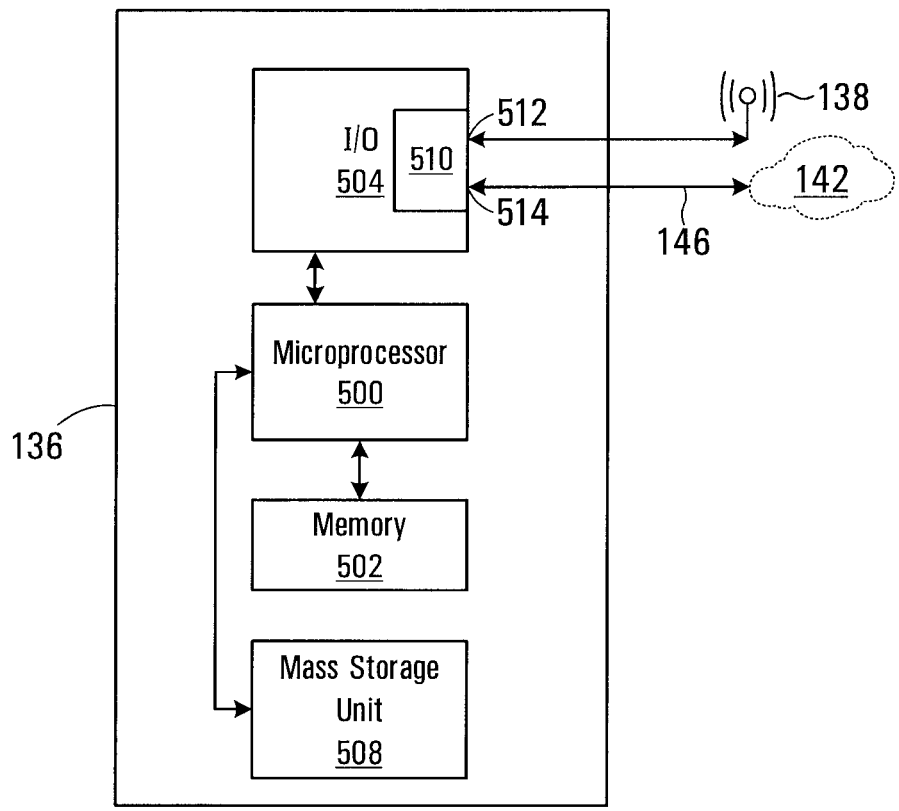
FIG. 5 is a block diagram of a processor circuit of a remote processor used in implementing the monitoring system shown in FIG. 1A.

A block diagram of a processor circuit for implementing the remote processor 136 is shown in FIG. 5. Referring to FIG. 5 the remote processor 136 includes a microprocessor 500, a memory 502, and an input output port (I/O) 504, all of which are in communication with the microprocessor 500. The microprocessor 500 may also include an interface port 506 (such as a SATA interface port) for connecting a mass storage unit 508 such as a hard drive or solid state drive. Program codes for directing the microprocessor 500 to carry out functions related to further processing data associated with the non-critical regions of interest may be stored in the memory 502 or the mass storage unit 508.

The I/O 204 includes an interface 510 for connecting to the transceiver 138. In one embodiment the interface 210 connects via the wired connection 146 between a port 514 to the wide area network 142. In other embodiments the connection may be wireless via a port 512 and the transceiver 138. Program codes may be loaded into the memory 502 or mass storage unit 508 via the interface 510. The I/O 504 may also have additional USB ports (not shown) for connecting a display, keyboard and/or other peripheral interface devices.

In one embodiment, the remote processor 136 may be operated by the mine and located in a central location connect by wired and/or wireless connections to the wide area network 142. In other embodiments the remote processor 136 may be operated by a vendor of the monitoring system 100. In another embodiment the remote processor 136 may be provided by a cloud computing platform, such as provided by Amazon Web Services (AWS). AWS's provides virtual computers on a subscription basis that provide attributes required of the remote processor 136, including the microprocessor 500, a graphics processing unit if required, local memory and mass storage.

Referring back to FIG. 3, a flowchart depicting blocks of code for directing the remote processor 136 to process data for non-critical regions received from the embedded processor 102 is shown generally at 330 in FIG. 3. The process begins at block 332, which directs the microprocessor 200 to further process the data associated with the non-critical region of interest. As disclosed above, examples of non-critical operating conditions would be fill proportion of the operating implement 106, degree of fragmentation, wear monitoring of the teeth, etc. Each of these conditions may be implemented by specific processes as described later herein. Block 334 then directs the microprocessor the 500 to generate output signals representing the results of the processing. The process 330 then continues at block 336, which directs the microprocessor 500 to cause the interface 510 to transmit the output signals back to the mining shovel 104.

The process 300 then continues at block 318, which directs the microprocessor 200 to receive the output signals from the remote processor 136. Block 320 then directs the microprocessor 200 to present the results of the remote processing via an electronic user interface, such as the display 226 in the cab 132 of the mining shovel 104 or other means, such as an application program on a device such as a tablet computer or smartphone. The displayed results provide feedback to the operator of the mining shovel 104, such as for example a payload fill-proportion of the operating implement 106, which may be useful in improving the efficiency of excavation and loading operations by the operator. Additionally, results related to the wear rate of the teeth provide the operator with information that may assist with planning for maintenance downtime. For example, if the results indicate that at least some of the teeth in the toothline 108 need replacement soon, maintenance may be scheduled for a break in operations or at a shift change.

One advantage of the monitoring system 100 and implemented processes 300 and 330, is that processing for critical operating conditions is performed locally by the embedded processor 102 while non-critical operating condition processing is offloaded from the embedded processor. Some of the non-critical further processing such as the determination of payload fragmentation may be processor intensive and if performed by the embedded processor 102 may cause reduced performance. This reduced performance may result in an alert of a critical operating condition being delayed, when it is desirable to issue such alerts without significant delay. While the embedded processor 102 may be limited in size and otherwise have constrained computing resources, the remote processor 136 need not be subjected to the same constraints and may be configured to handle a substantive processing load.

In other embodiments the output signals representing results of the further processing produced by the remote processor 136 may be transmitted to another processor (not shown) other than the embedded processor 102 associated with the mining shovel 104. For example, the mine worksite may have an operations control room at a location remote from the mine face 112, where overall mine operations are monitored for a plurality of mine faces being excavated by respective mining shovels. Non-critical data such as fill-proportion, fragmentation, and tooth wear may all be useful for planning of mine operations. For example, a specific shovel operator may be achieving a poor fill-proportion in comparison to other shovel operators and additional training or corrective action may be appropriate to increase operating efficiency. Similarly, wear monitoring of the teeth for the shovel facilitates maintenance planning for the least amount of shovel downtime. Fragmentation results provide an indication of the condition of ore being excavated for processing at ore processing facilities and provide information that may be useful in optimally controlling the ore processing.

Figure 6:
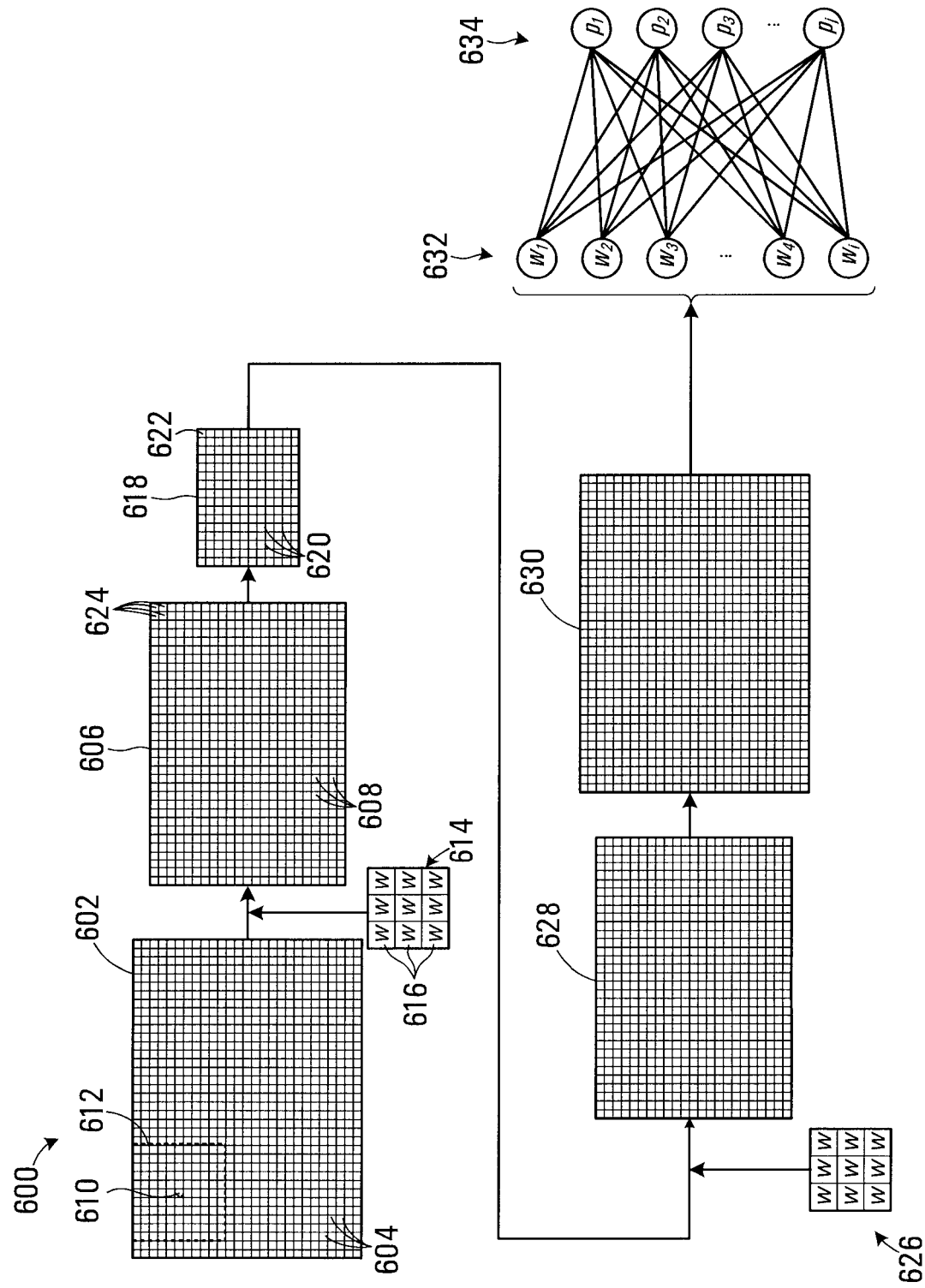
FIG. 6 is a schematic representation of a first neural network implemented on the processor circuit shown in FIG. 2.

Regions of interest within the images are identified using the first neural network at block 304, as disclosed above. Referring to FIG. 6, a convolutional neural network is depicted schematically at 600. The embodiment of the neural network 600 shown in FIG. 6 is only one example of a network that may be configured to produce the pixel classification outputs at the output layer 634. A captured image is represented at 602 and includes a plurality of pixels 604. In this embodiment the image 602 may include pixel intensity values within a wavelength range of interest, such as infrared wavelengths that convey thermal image features associated with the operating implement. In other embodiments additional pixel data sets of different wavelength ranges may be included. In neural network terms, each pixel 604 acts as an input neuron for the neural network 600.

The neural network 600 also includes a convolution layer 606 having a plurality of nodes or neurons 608. In the embodiment shown, a pixel 610 in the input image 602 is to be classified, and the classification is performed on the basis of a patch of pixels 612 surrounding the pixel 610. In the embodiment shown, the patch 612 is illustrated as an 11×11 pixel patch. However in general the patch may be sized in accordance with the sizes of features in the captured image.

In some embodiments, the patch may be selected sized based on an initial size estimate for the patch 612.

In the neural network 600 each neuron 608 in the convolution layer 606 is connected to a subset of the input neurons in the image 602 by defining a convolution kernel 614. The convolution kernel 614 in this embodiment has a size of 3×3 pixels and a set of 9 weights W (616). The kernel 614 is centered over successive pixels in the patch 612 of the image 602 effectively connecting a corresponding neuron 608 in the convolution layer 606 to corresponding subsets of the pixels in the captured image 602. For the example of pixel 610, the convolution kernel 614 is passed over the patch 612 and the weights 616 are applied to the pixel intensity values to produce the output for a neuron in the convolution layer 606 that corresponds to the input pixel 610. The convolution kernel 614 similarly connects and produces outputs for other corresponding neurons 608 in the convolution layer 606. In this embodiment the convolution kernel 614 applies the same weights W to each subset of input pixels and thus will become sensitive to the same features in the input pixels when the weights are subsequently determined during a training of the neural network 600.

In one embodiment pixel-wise processing may proceed at a stride of 1 or at a stride greater than 1. In general, the stride may be selected by validating the pixel classification output and selecting a stride based on a trade-off between processing time and the effectiveness of the location of the wear part in the image 602. An advantage of having the same weights 616 for the convolution kernel 614 is that successive patches 612 have a large overlap and convolution results may be saved and re-used for each successive patch, thus significantly reducing the number of computations required. This has the effect of significantly reducing processing time, both in training and subsequently when performing real fragmentation assessments using the trained network 600.

In other embodiments, a sparse kernel may be used to perform the convolution. A sparse kernel is constructed by inserting rows and columns of zero values in the convolution kernel 614. The sparse kernel may have a single row and column of zero values inserted between each element or multiple rows and columns of zero values inserted between elements. The sparse kernel has an advantage over processing using a stride length of greater than 1, particularly where the processing is performed by the GPU 234 (shown in FIG. 2) since operations are still performed on successive adjacent pixels in the input pixel data sets. Processing by a GPU is very effective under such conditions, while processing as a stride greater than 1 requires that processing of some input pixels is skipped, which makes much less efficient use of GPU processing capabilities.

The neural network 600 also includes a pooling layer 618, including a plurality of pooling neurons 620. The pooling layer 618 combines outputs of the convolution layer 606 to condense the information to make the neural network 600 less sensitive to input shifts and distortions. In one embodiment a max-pooling process is applied that finds a maximum output value within a group of outputs from the convolution layer 606 and sets the output of a corresponding neuron 620 in the pooling layer 618 to the maximum output value. For example, the output 622 in the pooling layer 618 may be set to the maximum output of the four output neurons 624 in the convolution layer 606. Alternatively, other pooling processes such as average pooling may be implemented where outputs in the convolution layer 606 are averaged to produce the output in the pooling layer 618. In other embodiments, stochastic pooling may be used, where a random output within a group of outputs in the convolution layer 606 is selected to produce the output in the pooling layer 618.

The convolution and pooling layers 606 and 618 have the advantage of being computationally efficient but provide a coarse region prediction output at the pooling layer 618 that would not facilitate a pixelwise prediction for each pixel 604 in the original image 602. In the embodiment shown the pooling layer 618 is followed by an up-sampling process that relates the coarse outputs at the pooling layer 618 back to the original pixels 604 of the image 602. In this embodiment the up-sampling process is implemented using a de-convolution filter 626 (similar to the convolution kernel 614) to generate a de-convolution layer 628 in which the de-convolution filter works essentially backwards compared to the convolution kernel 614. For the example of the 3×3 de-convolution filter 626 would take a single output 622 of the pooling layer 618 and generate 9 outputs in accordance with the weights W. The weights W of the deconvolution filter 626 need not be fixed, but may be determined by training as described below.

In a similar manner to the pooling process that produced the pooling layer 618, a subsequent up-pooling process may also be implemented to convert the de-convolution layer 628 into a pixelwise output at 630 having the same number of outputs as there are pixels 604 in the image 602.

In this embodiment the neural network 600 includes a fully connected layer 632 that receives outputs form the corresponding neurons 620 in the pooling layer 618. Each neuron in the fully connected layer 632 has an associated weight $w_i$. In other embodiments there may be more than one fully connected layer.

Figure 7:
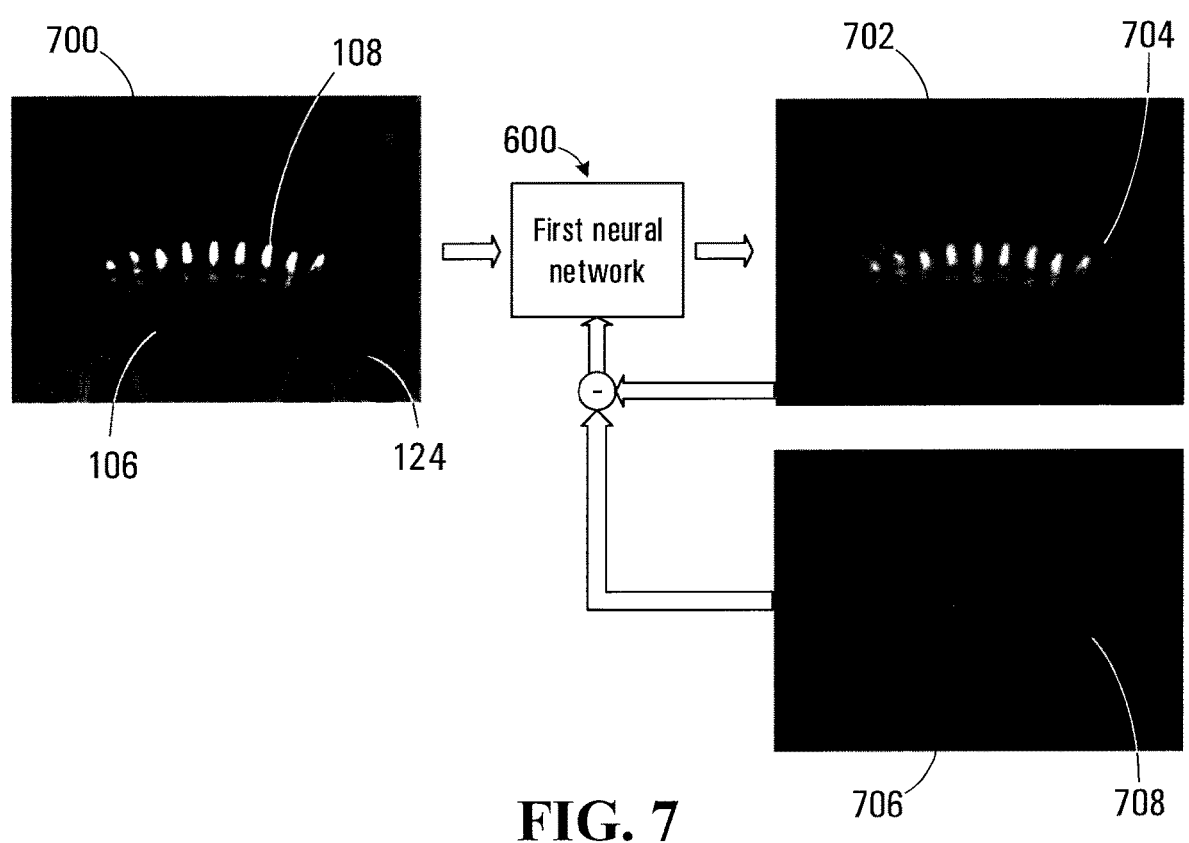
FIG. 7 is an example of images and outputs produced by the first neural network shown in FIG. 6.

The neural network 600 further includes an output layer 634 that includes a plurality of neurons that produces probabilities $p_j$ that the image pixel 610 in the patch 612 corresponds to specific region of interest. Each of the probabilities $p_j$ in the neurons of the output layer 634 represents a probability that the pixel 610 corresponds to a specific region of interest. For example $p_1$ may represent a probability that the pixel 610 is associated with one of the teeth in the toothline 108, $p_2$ a probability that pixel 610 is associated with the payload within the operating implement 106, and $p_3$ a probability that the pixel 610 is associated with the hoist cable 124. By generating probabilities $p_1$, $p_2$, etc. for each of the pixels 604 in the image 602, a probability map may be produced for each region of interest. Referring to FIG. 7 an image 700 is shown including the operating implement 106, toothline 108, and hoist cable 124 is shown as an example of the input image 602 to the neural network 600. Processing through the neural network 600 to generate probabilities $p_1$ associated with pixels in the image 700 being associated with a region including the teeth results in a probability map 702 in which lighter pixels in a region 704 have been assigned a higher probability of being associated with the toothline 108 of the operating implement 106.

In general the network 600 is initially configured to set weights $w_i$ to some initial value, such as a random number between 0 and 1, for example. The neural network 600 is then trained using training images that have been examined and labeled. An example of a labeled training image is shown at 706 in FIG. 7. The labeled training image 706 may have been generated by a human operator examining the image to identify a tooth region of interest, which is then marked by a bounding box 708 and saved along with the labelling information as a labeled training image. During training of the neural network 600, the probability map 702 produced by the neural network 600 is compared to the labeled training image 706 and errors are computed for each pixel and fed back to the neural network to make adjustments to the weights $w_i$. Initially when the weights $w_i$ are set to their initial value, the neural network 600 will produce a probability map 702 that has poor correlation to the labeled training image 706. A cost function is evaluated expressing differences between the probability map 702 and the labeled training image 706 for each of a plurality of labeled training images used as inputs to the neural network 600. A minimization algorithm, such as a batch stochastic gradient descent minimization, is then applied to determine new values for the weights $w_i$. This step generally involves determining the gradient of the cost function using a back-propagation algorithm to adjust the weights $w_i$ until the generated probability map 702 more closely resembles the labeled training image 706. It is generally desirable to have a sufficient number labeled training images under different lighting and other conditions, differing scale, and differing types of operating implements and wear parts. A further set of labeled images may be used for validation of the network 600 to evaluate training effectiveness. Following training, the neural network 600 will be configured to identify regions of interest within input images such as the image 602 under a wide variety of conditions provided by the labeled training images.

In one embodiment training the first neural network to identify regions of interest proceeds as described above and is followed by a validation of the network 600 using the further set of labeled images to evaluate training effectiveness. A plurality of neurons are then removed or pruned. In one embodiment, neurons 632 having a weighting $w_i$ below a pruning threshold may be eliminated to produce a pruned neural network having a second plurality of interconnected neurons. The performance of the pruned neural network 600 is then re-evaluated on the further set of labeled images. Evaluating performance the neural network and re-evaluating performance of the pruned neural network based on computing a cost function that accounts for increased processing speed of the pruned neural network in producing the probability map 702 and reduced accuracy in producing the labeled result associated with the previously labeled training images. The process may then be repeated while further pruning of neurons has an acceptable effect on the performance of the neural network. As an example, if following a pruning of the neural network 600 the processing time is reduced by 10% but the error between the probability map 702 and labeled training image 706 only increases by 1%, the pruning process may be continued by further lowering of the pruning threshold. If however the pruning process produced a 10% reduction in processing time for a 20% increase in error, the network configuration may be restored to the immediately preceding state. Following the pruning process, a pruned network 600 having a reduced number of neurons is then used to implement the first neural network on the embedded processor 102. The pruning process thus ensures that the neural network 600 is configured to provide close to optimal processing performance.

Figure 8:
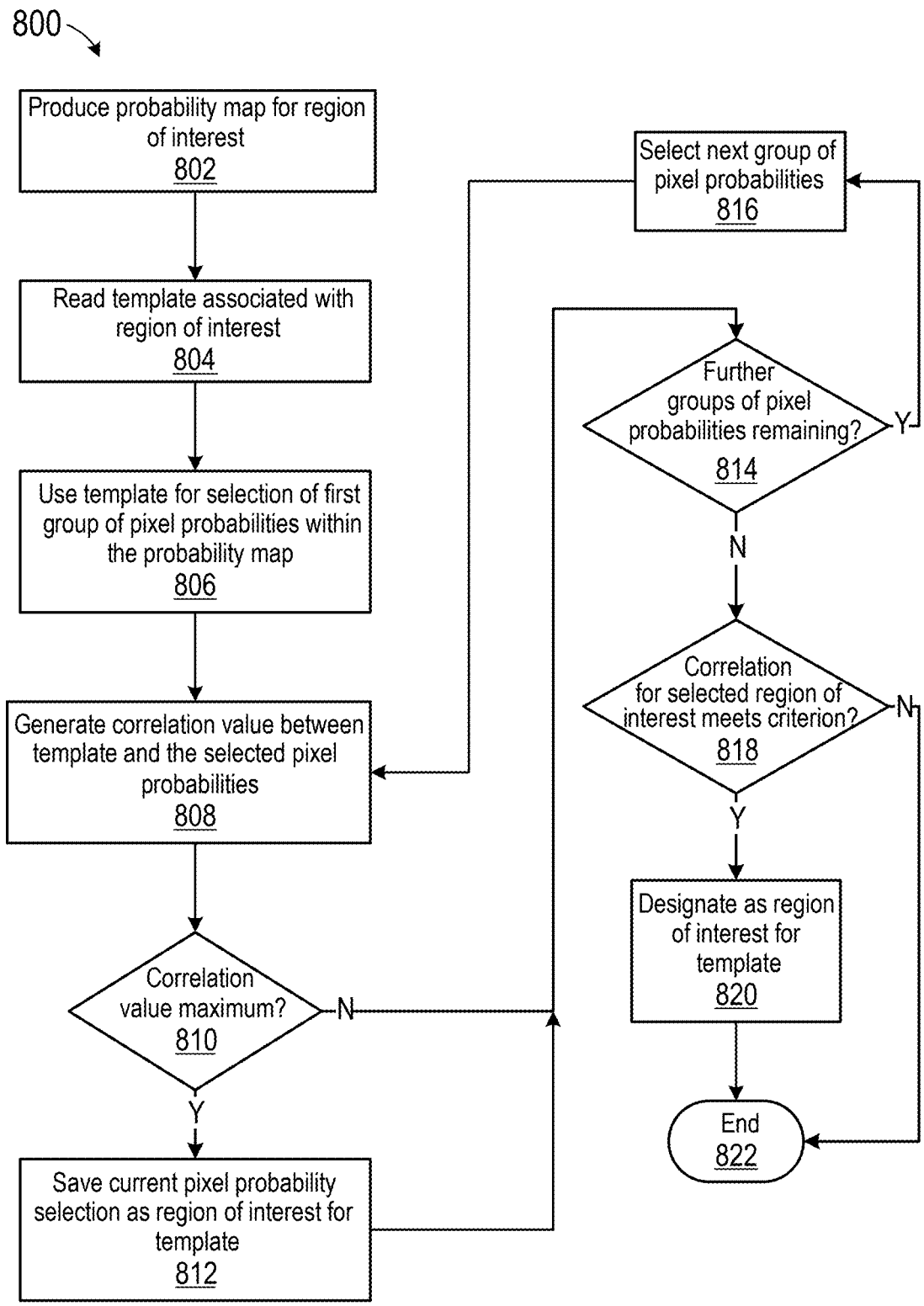
FIG. 8 is a process flowchart including blocks of codes for directing the processor circuit of FIG. 2 to implement a portion of the process shown in FIG. 3.

An example of a process for implementing block 304 of the process 300 is shown at 800 in FIG. 8. Referring to FIG. 8, the process begins at block 802, which directs the microprocessor the microprocessor 200 of the embedded processor 102 to produce a probability map including a probability of each image pixel in the image being associated with a particular region of interest, generally as described above. Block 804 then directs the microprocessor 200 to read a template associated with a region of interest. Templates for various regions of interest may be saved in the memory 202 or mass storage unit 208 for performing a subsequent template matching process. The template includes information based on a physical extent and shape of an object within the region of interest. For the example of the toothline 108 in FIG. 7, the template information may define a rectangular block corresponding to the bounding block 708 in the labeled training image 706. As another example, if the region of interest is a single tooth in the toothline 108, the template may be generally the same size as a single tooth in the probability map 702 and may have a generally trapezoidal shape. The template thus defines a general shape and physical extent of a region of interest. In some embodiments where a scale of the image differs depending on the position of the operating implement 106 with respect to the image sensor 128, a scale of the template may be changed to account for the differences in image scale.

Block 806 then directs the microprocessor 200 to select a first group of pixel probabilities within the probability map 702. Referring back to FIG. 7, a template 710 associated with the toothline 108 is shown placed over the probability map 702 to select a first group of pixel probabilities within the probability map.

Block 808 then directs the microprocessor 200 to generate a correlation between the template and the selected pixel probabilities. In one embodiment, the values of the selected pixel probabilities may be summed to generate an overall correlation value for the selected pixel probabilities.

The process then continues at block 810, which directs the microprocessor 200 to determine whether the correlation value a maximum for the template thus far in the process. If the correlation value is at a maximum, then the microprocessor 200 is directed to block 812, which directs the microprocessor 200 to save the current pixel probability selection as the region of interest for the probability map 702. Block 812 then directs the microprocessor 200 to block 814. If at block 810, the correlation value is not at a maximum, then the microprocessor 200 is directed to block 814.

Block 814 then directs the microprocessor 200 to determine whether there are further groups of pixel probabilities within the probability map 702 remaining to be evaluated. If further groups of pixel probabilities remain, the microprocessor 200 is directed to block 816, which directs the microprocessor to select the next group of pixel probabilities. In the embodiment shown in FIG. 7, the template 710 may be moved over by one or more pixels from the first group of pixel probabilities to select a next group of pixel probabilities such that the template is successively moved through the probability map 702. Blocks 808-814 are then repeated as described above for the next group of pixel probabilities.

Once at block 814 all groups of pixel probabilities in the probability map 702 have been evaluated for the correlation, the region selected at block 812 will be the selected region of interest for the probability map and the microprocessor is directed to block 818. Block 818 directs the microprocessor 200 to determine whether the selected region of interest has meets a correlation criterion. In some cases, even though the region of interest selected at block 812 has the highest correlation value, the correlation may be weak and the region should thus not be designated as a region of interest. In one embodiment, block 818 directs the microprocessor 200 to determine whether the correlation value for the region meets a minimum threshold, in which case the microprocessor is directed to block 820. Block 820 directs the microprocessor 200 to designate the region as a region of interest corresponding to the template (in this case the toothline 108). Block 820 then directs the microprocessor 200 to block 822, where the process 800 ends. If at block 818, the correlation value does not meet the criterion, the microprocessor 200 is directed to block 822 where the process ends without a region of interest being designated for the template.

Figure 9A:
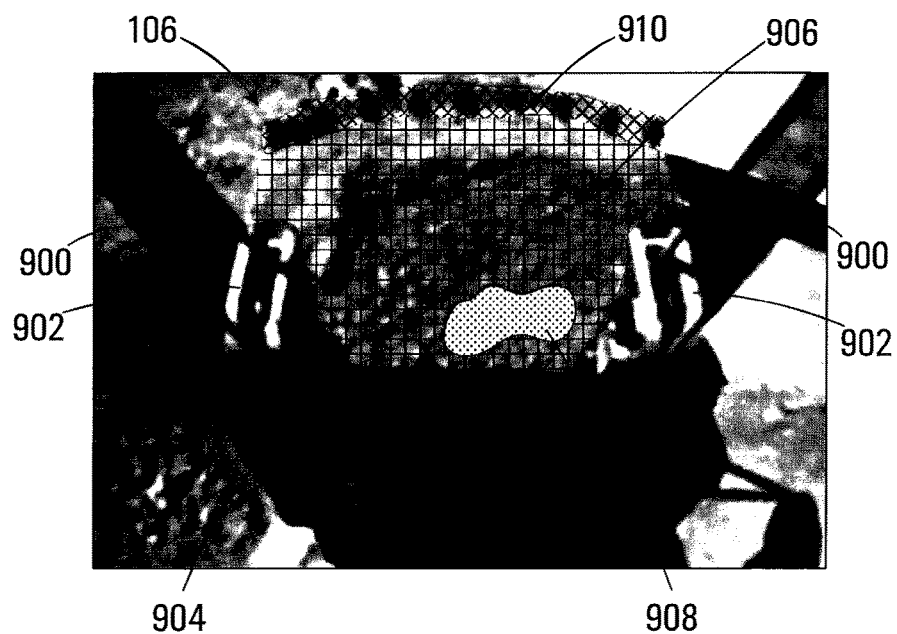
FIG. 9A is an example of a probability map representing the output of the first neural network shown in FIG. 6.

The process 800 may be successively run for a plurality of probability maps associated with different regions or interest, each region of interest also having a respective template. A single image may thus have more than one region of interest designated. Examples of identified regions of interest in a probability map of a loaded operating implement 106 are shown in FIG. 9. In the probability map various regions of interest are shown shaded and the regions 906, 908, and 910 have been hatched for purposes of illustration. The hoist cables are identified as a region of interest at 900, the sheaves at 902, and a case region of the operating implement at 904. In this probability map, the operating implement 106 is loaded with a payload comprising mostly fine material, identified as a fines region 906, but with a single boulder, identified as a boulder region 908 lying on top of the fine material. The teeth are identified as a tooth region 910, partly obscured by the fines region 906. In one embodiment, the tooth region 910 and boulder region 908 are designated as critical regions while the fines region 906 are designated as non-critical regions. For example, the identification of the boulder region 908 within the operating implement 106 may be sufficient in itself to alert the operator, since the neural network 600 will have been trained to identify contiguous material portions exceeding a certain size as boulder regions. In the case of the tooth region 910, further processing is generally required as described later herein. The case 904, sheaves 902, and hoist regions 900 may not be further processed or may be processed to determine their structural integrity.

Figure 9B:
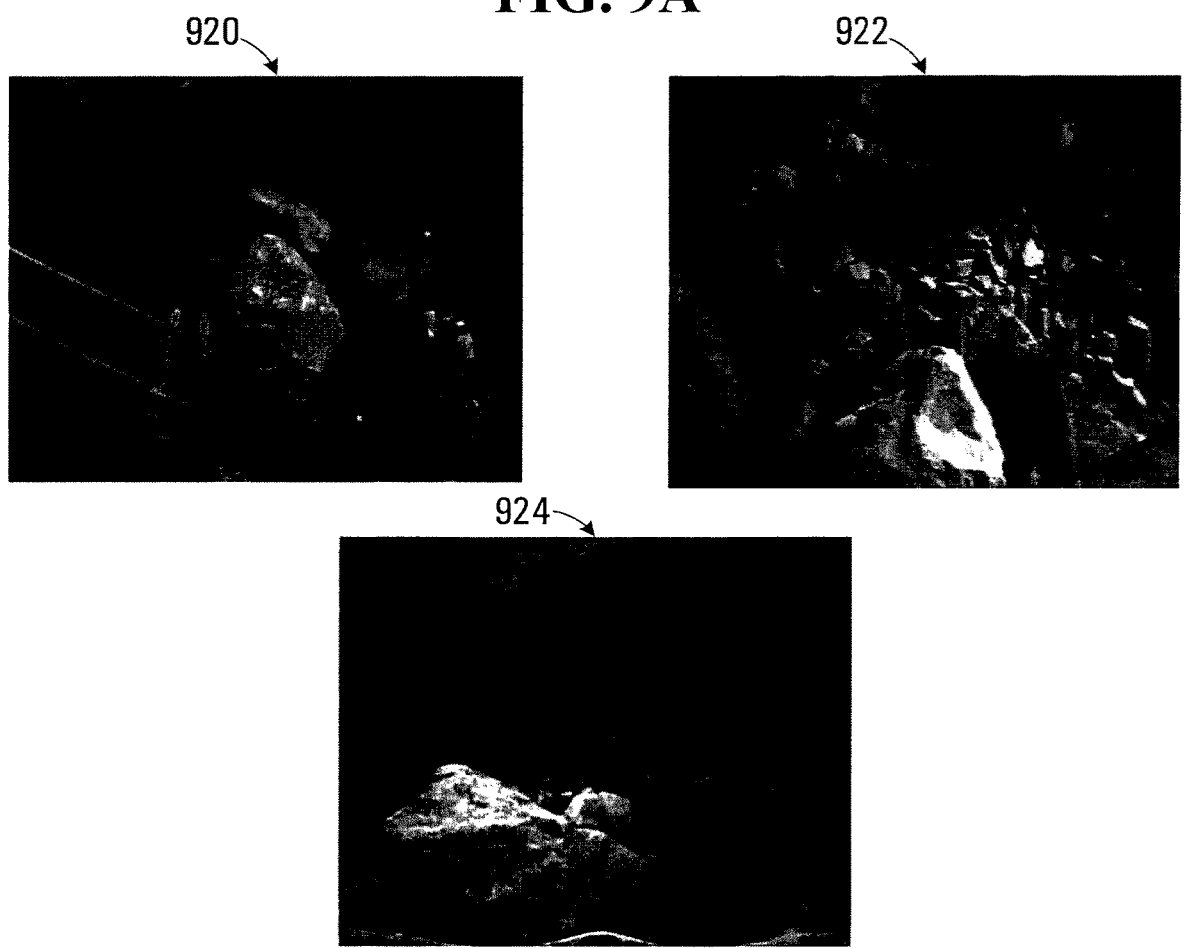
FIG. 9B are example images of large boulders within the payload of a shovel.

Examples of boulders within the payload of an operating implement of a cable shovel are shown at 920 and 922 in FIG. 9B. A similar example for a hydraulic face shovel is shone at 924 in FIG. 9B.

Figure 10:
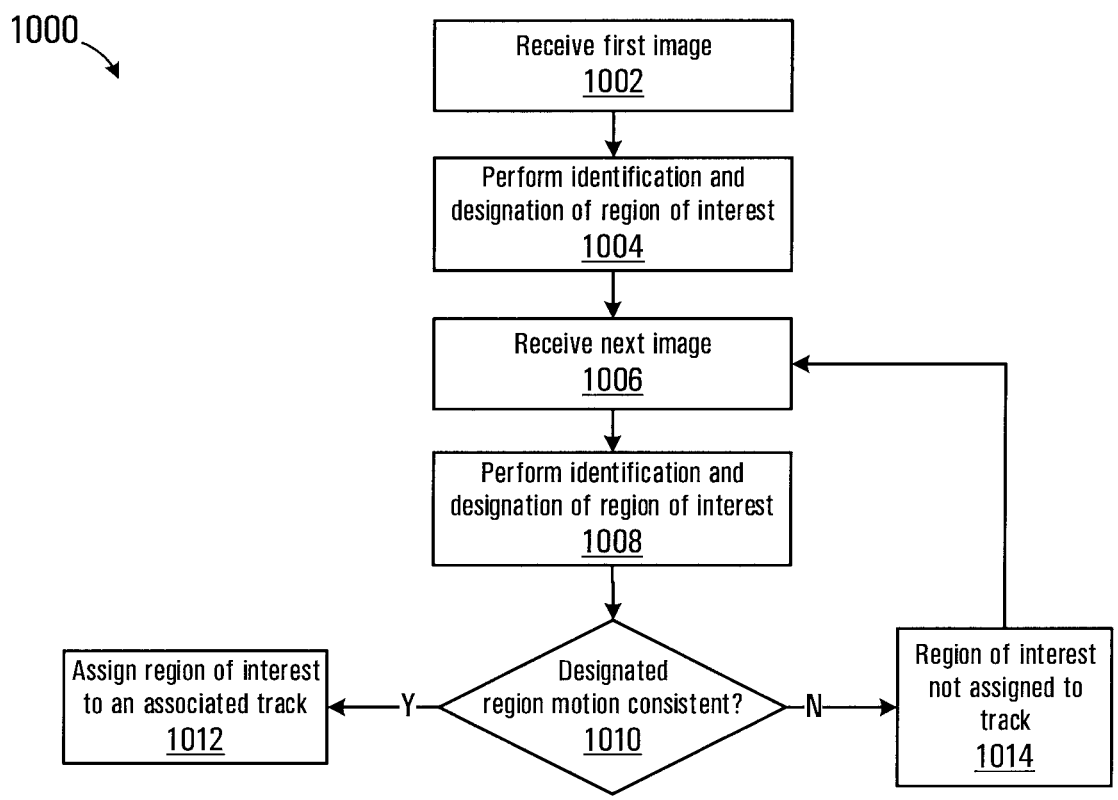
FIG. 10 is a process flowchart showing blocks of codes for directing the processor circuit of FIG. 2 to track movement of regions of interest.

In some embodiments the same designated regions of interest may appear in successive images received from the image sensor 128. Referring to FIG. 10, a process for tracking designated regions between images is shown generally at 1000. The process begins at block 1002 which directs the microprocessor 200 of the embedded processor 102 to receive a first image from the image sensor 128. Block 1004 then directs the microprocessor 200 to perform identification and designation of at least one region of interest within the image generally as described above in connection with the process 800 of FIG. 8. Block 1006 then directs the microprocessor to receive a next image from the image sensor 128 and block 1008 directs the microprocessor to process the image as in block 1004. The process then continues at block 1010, which directs the microprocessor 200 to determine whether the motion of a designated region is consistent between the images. In one embodiment the motion of each designated region of interest may be estimated by a Kalman filter implemented by the microprocessor 200 that predicts a location of the designated region in successive images. If at block 1010 the predicted location is determined by the microprocessor 200 to be proximate an expected range of positions position within the image, the microprocessor is directed to block 1012 and the designated region is added to an associated track and saved in the memory 202 of the embedded processor 102. If however at block 1010 the predicted location is determined by the microprocessor 200 to be outside an expected range of positions position within the image, the microprocessor is directed to block 1014, which directs the microprocessor not to assign the region to a track. In general tracks that have consecutively assigned designated regions of interest are regarded as reliable tracks and may be processed in preference to other tracks to extract critical or non-critical operating condition information.

In some embodiments, motion sensors such as an inertial sensor may be placed on a moving arm (for example the crowd 122 of the mining shovel 104 shown in FIG. 1A) to provide signals that may be used to determine a current operational state of the mining shovel. For example, back and forth movements of the crowd 122 may be indicative of active loading thus increasing the likelihood that tooth damage may occur. Similarly, sensors on the crowd 122 may indicate whether the operating implement 106 and crowd are moving or static.

Missing Tooth Detection

As disclosed above, the toothline 108 of the operating implement 106 may be identified and designated as a critical region for a critical region suitable for extraction of a missing tooth condition. In general, an operating implement may include one or more wear parts that are expected to wear during operation and require eventual replacement. In the case of the operating implement 106 the toothline 108 includes a plurality of wear components or individual teeth.

Figure 11:
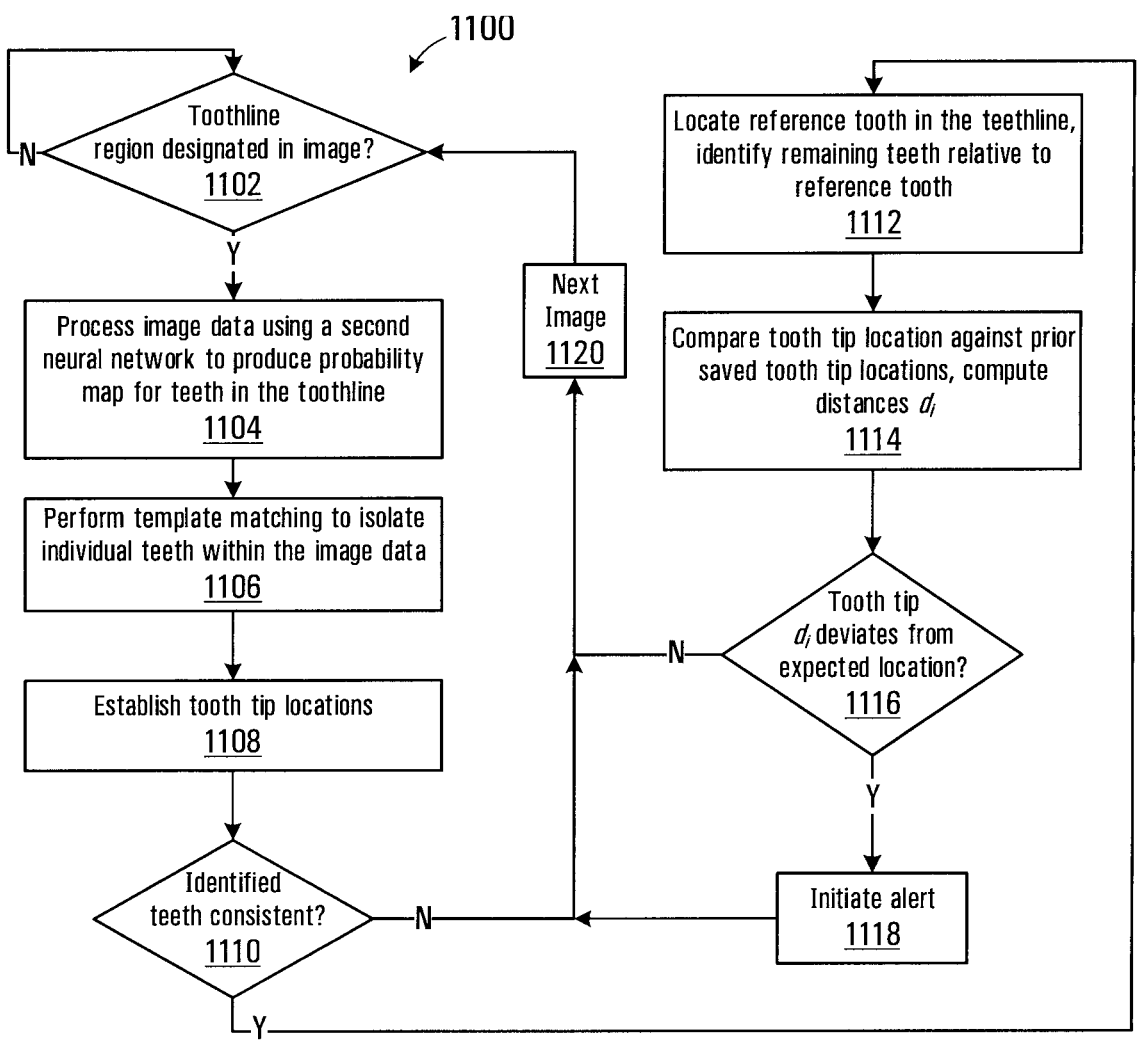
FIG. 11 is a process flowchart showing blocks of codes for directing the processor circuit of FIG. 2 to implement a missing tooth detection process.

Referring to FIG. 11, a missing tooth detection process implemented on the embedded processor 102 is shown generally at 1100. The process begins at block 1102, which directs the microprocessor 200 to determine whether a designated region corresponding to the toothline 108 of the operating implement 106 has been identified following execution of the process 800 in FIG. 8. If no toothline has been designated, the microprocessor 200 is directed to repeat block 1102. Under some conditions, such as when the operating implement 106 is actively excavating the mine face 112, the toothline 108 may be obscured and thus no toothline region will be identified. Similarly, the payload 110 may partly or completely obscure the toothline 108. During a portion of the operation cycle between unloading the payload 110 into the haul truck 140 and before commencing excavation, the toothline 108 may present an unobscured view most suitable for missing tooth detection.

Figure 12A:
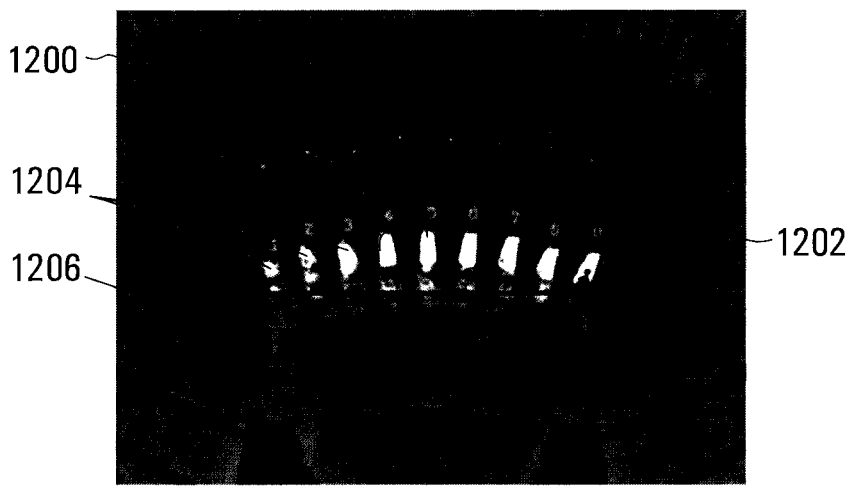
FIG. 12A is an example of a probability map output by a second neural network implemented on the processor circuit shown in FIG. 2 for identifying wear part components.

If at block 1102, a toothline 108 has been designated, the microprocessor 200 is directed to block 1104. Block 1104 directs the microprocessor 200 to process the data in the designated region of interest using a second neural network to identify individual teeth within the toothline 108. The second neural network may have a similar configuration to the neural network 600 shown in FIG. 6, but is trained via labeled training images of individual teeth to identify individual teeth in the toothline 108. The second neural network produces a probability map, an example of which is shown in FIG. 12 at 1200. The toothline region of interest 1202 is shown enclosed by a bounding box 1202 established by the process 800 described above while individual teeth have a lighter shade, indicating higher probability of being associated with an individual tooth of the toothline 108.

Block 1106 then directs the microprocessor 200 to perform a further template matching process as described above in connection with the process 800 shown in FIG. 8, in this case using a template corresponding to the wear component (i.e. the individual tooth). As disclosed above, the template may be a generally trapezoidal shape corresponding to the shape and size of the tooth.

The process 1108 then directs the microprocessor 200 to locate a tracking feature on each tooth. In this embodiment the tracking feature is selected as the respective tooth tips 1204 indicated by dots in FIG. 12. In one embodiment the tooth tip is determined by selecting pixels in image data that correlate with a tooth template above a certain threshold. In the selected pixels, clusters of pixels with a size (i.e. number of pixels) less than a threshold size are discarded. A bounding contour for remaining clusters of pixels is obtained such as shown by the line 1212 for the tooth "4" in FIG. 12. The tip of the tooth is then selected from the points in bounding contour taking into account of the angle of each tooth within the toothline.

Block 1110 then directs the microprocessor 200 to perform a series of consistency checks to determine whether the teeth have been correctly identified. The microprocessor 200 is directed to determine whether the identified teeth are equally spaced and correspond to an actual number of teeth on the operating implement 106. Additionally, the microprocessor 200 is directed by block 1110 to determine whether the respective tooth tips 1204 lie along a line indicated by the broken line 1206 in FIG. 12 that has a curvature that generally matches a physical curvature for the teeth of the operating implement 106. Any individual identified teeth that fall outside a set of criteria based on the physical configuration of the operating implement 106 are not designated as being part of the toothline 108.

The process 1100 then continues at block 1112, which directs the microprocessor 200 to locate a reference tooth within the toothline 108. In this embodiment a central tooth 1208 (numbered as tooth "5") is selected as the reference tooth. The remaining teeth are then numbered as teeth 1-4 and 6-9 with respect to the reference tooth 1208. In one embodiment the reference tooth 1208 may be tracked in accordance with the process 1000 shown in FIG. 10 to determine whether the toothline 108 appears consistently in successive images.

Block 1114 then directs the microprocessor 200 to compare each tooth tip location against a prior saved tooth tip location in memory 202. While the operating implement 106 is moving the toothline 108 should follow a generally smooth track. In FIG. 12, prior saved tooth tip locations are shown at 1210. In one embodiment block 1114 directs the microprocessor 200 to calculate a distance $d_i$ between the prior tooth tip location and the current tooth tip location for each tooth where i is the assigned tooth number. The distances $d_i$ are used by the microprocessor 200 to determine how long the current detected tooth tips are compared to the prior tooth tips. Block 1116 then directs the microprocessor 200 to determine whether the distances $d_i$ are less than a missing tooth threshold, in which case the information associated with each tooth may be used to update the saved information in memory 202. Block 1116 then directs the microprocessor 200 to block 1120, where the next image is selected for processing.

If at block 1116 the distance $d_i$ is greater than a missing tooth threshold, the microprocessor 200 is directed to block 1118. Block 1118 directs the microprocessor 200 to initiate a missing tooth alert.

In one embodiment to reduce the possibility of initiating a false alert, tooth length calculations from several consecutive frames for a portion of an operating cycle of the operating implement 106 may be analyzed at block 1114 prior to making the determination as to whether the tooth tip $d_i$ deviates from the expected location. In general, the operating cycle of the mining shovel 104 may be viewed as a series of movements that are repeated while loading the haul truck 140. For example the operating cycle may involve excavation of the mine face 112 to fill the operating implement 106 with payload 110, lifting the payload, rotating the housing 114 about the crawler track 116 and extending the operating implement with respect to the saddle block 120 to position the operating implement above the haul truck 140, and dumping the payload into the haul truck. The portion of the operating cycle may correspond to the time when the operating implement 106 is not carrying or excavating a payload 110. In some embodiments a level of confidence may be calculated based on the number of frames within which the deviation in d, occurs. For example, a single deviation d, may be initially ignored, but several consecutive deviations in d, increase the level of confidence in making the determination at block 1116 that an alert should be initiated.

Figure 12B:
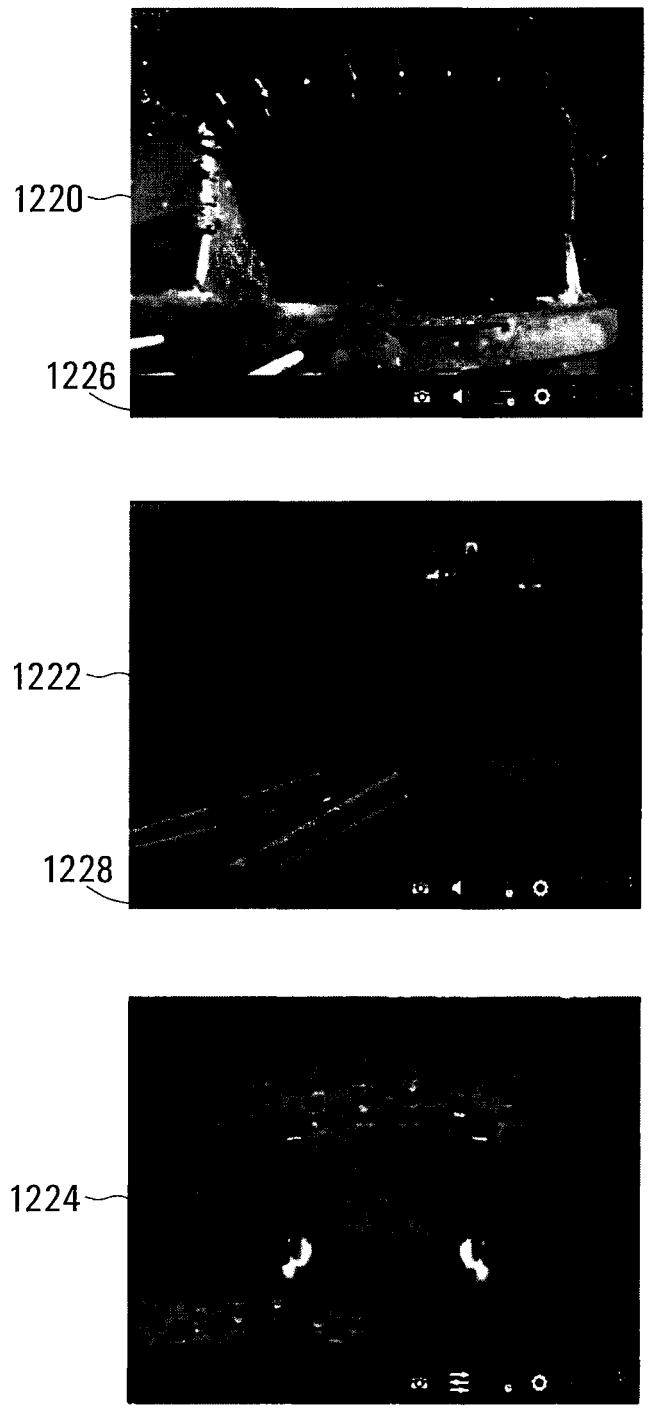
FIG. 12B is an example of outputs produced and displayed by the process shown in FIG. 11.

Examples of output produced by process 1100 and displayed on the display 226 are shown in FIG. 12B. The example outputs 1220 and 1222 are produced using a monitoring system 100 implemented using visible wavelength sensitive image sensors and each show a missing tooth in a different color or shade of in the schematic tooth representation 1226 and 1228. The example output 1224 is produced using a monitoring system 100 implemented using an infrared wavelength sensitive image sensor. The thermal imaging causes a contrast between the hot toothline and the surrounding cooler background regions.

In this embodiment, missing tooth detection is considered a mission critical function and is performed onboard the mining shovel 104 by the embedded processor 102.

Tooth Wear Monitoring

At block 304 of the process 300 implemented on the embedded processor 102, images are processed to identify images that have a clear wear landmark region that will facilitate tooth wear monitoring. It will generally be sufficient to select only a single image for each operating cycle of the mining shovel 104 for transmission to the remote processor, since the wear rate of the teeth is expected to occur over a significantly greater timeframe than the operating cycle of the mining shovel. In other embodiments, a best image over a period of time, e.g. 5 minutes having the clearest landmarks identified is transmitted to the remote processor 136 for further processing. In this embodiment, since the toothline region for the purposes of wear monitoring is considered as a non-critical region, the embedded processor 102 only performs the initial identification and designation of the region of interest and then transmits the image data to the remote processor remote processor 136 for further processing.

Figure 13:
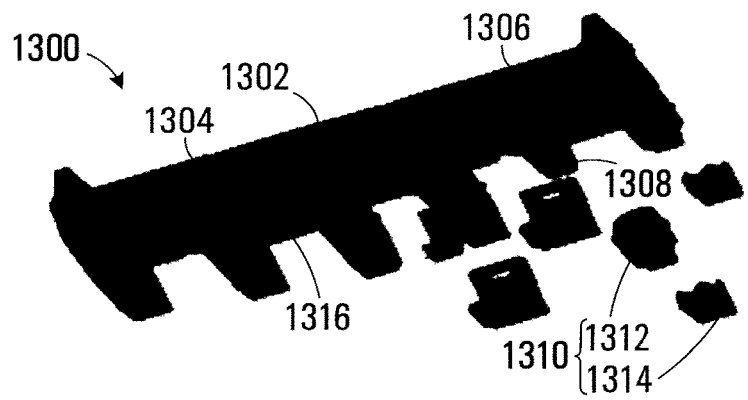
FIG. 13 is a is a process flowchart including blocks of codes for directing the processor circuit of FIG. 2 to implement a portion of the process shown in FIG. 3 for identifying image data suitable for transmission to the processor circuit of FIG. 5 for further processing.

Referring to FIG. 13, an example of a supporting structure for the toothline 108 is shown at 1300. The teeth are supported by a cast lip 1302, having lifting eyes 1304 and 1306. The cast lip 1302 has protrusions 1308 for receiving a two part removable tooth 1310 including a nose 1312 and tip 1314. The structure 1300 also includes a removable lip shroud 1316 protecting remaining portions of the cast lip from wear. The nose 1312, tip 1314, and lip shroud 1316 are the wear parts that may be replaced. The structure 1300 supporting the toothline 108 provides wear landmarks that include portions of the operating implement that wear at a lesser rate than the teeth during operation of the operating implement 106 of the mining shovel 104, such as the lip shroud, lifting eyes, and cast lip. The wear landmarks provide reference points for converting pixel-based measurements into real world dimensions such as tooth length. Known dimensions associated with wear landmarks allow measurements made on the basis of image data to be established and compared between images having a differing scale and/or perspective.

Figure 14:
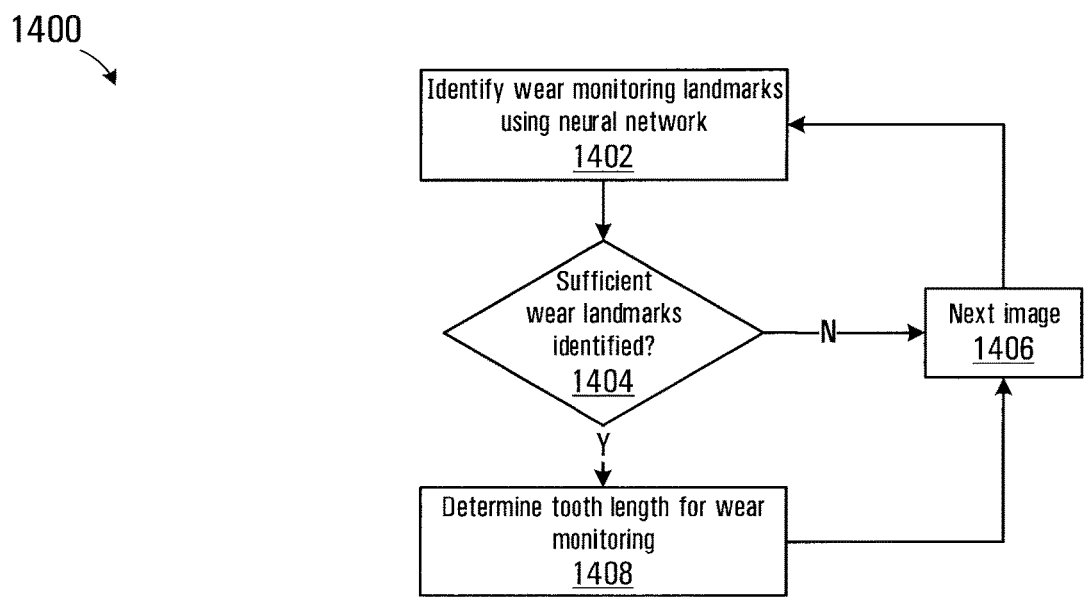
FIG. 14 is a perspective view of a structure supporting a toothline region of an operating implement associated with the mining shovel shown in FIG. 1.

A process for performing tooth wear monitoring on the remote processor 136 is shown generally at 1400 in FIG. 14. Referring to FIG. 14, the process begins at block 1402, which directs the microprocessor 500 of the remote processor 136 to process the images using a neural network (such as shown at 600).

Figure 15:
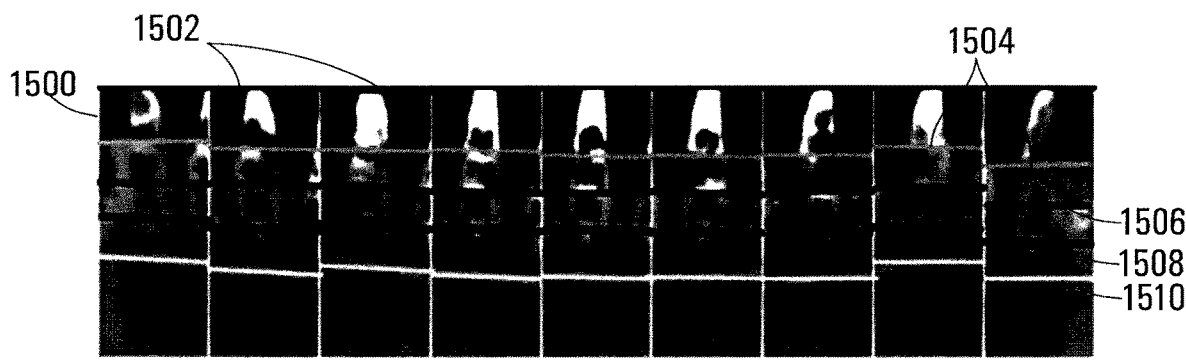
FIG. 15 is an example of a labeled training image showing a toothline region and wear landmarks for an operating implement.

The neural network may have been trained using a plurality of labeled training images of an empty operating implement 106 to identify parts of the structure supporting the toothline 1300 that act as landmarks for determining tooth wear. The wear landmarks may include portions of the operating implement that wear at a lesser rate than the teeth during operation of the operating implement 106 of the mining shovel 104, such as the lip shroud, lifting eyes, and cast lip. An example of a labeled training image including an identification of landmarks is shown at 1500 in FIG. 15. The landmarks are indicated on a tooth-by-tooth basis and include a set of lines 1502 corresponding to the respective tooth tips (1315 in FIG. 13), a set of lines 1504 corresponding to the lip shroud 1316, a set of lines 1506 corresponding to the lifting eyes 1304 and 1306, a set of lines 1508 corresponding to the cast lip and a set of lines 1510 indicating a demarcation between the cast lip 1302 and a remaining bucket portion (not shown in FIG. 14) of the operating implement 106.

Block 1402 of the process 1400 directs the microprocessor 500 to perform a tooth-by-tooth identification of wear landmarks using the trained neural network. For each tooth at least a subset of the landmarks should be identifiable. The process 1400 then continues at block 1404, which directs the microprocessor 500 to determine whether sufficient wear landmarks have been identified by the neural network to facilitate determination of the wear status (i.e. the length of each of the teeth) for wear monitoring. If an insufficient number of wear landmarks were identified then the microprocessor 500 is directed to block 1406 and the next image having a clear wear landmark region of interest is processed.

If at block 1404, sufficient wear landmarks are identified, the microprocessor 500 is directed to block 1408.

Block 1408 directs the microprocessor 500 to compare the identified landmarks to a set of landmarks on a clear reference image, in which landmarks for each tooth have been manually identified, and the tooth lengths are measured from each landmark and scaled in accordance with known measurements of the operating implement 106. In one embodiment, block 1408 also directs the microprocessor 500 to compute a confidence level associated with the tooth length measurement based on the number of detected landmarks for each tooth.

The resulting tooth lengths determined by the remote processor 136 may then be transmitted back to the mining shovel 104 for display on the display 226 associated with the embedded processor 102. Alternatively, or additionally the tooth lengths may be transmitted to operations control room at a location remote from the mine face 112 where the information provides an input for maintenance planning. The further processing performed by the remote processor 136 may further generate a wear rate associated with the teeth, a wear pattern indicating whether some teeth wear faster than others, and an estimated service life time for each tooth in the plurality of teeth based on current usage.

In this embodiment, tooth wear monitoring is considered to be of lower priority than missing tooth detection since wear generally occurs over a longer period of time. The tooth wear monitoring functions are thus largely offloaded from the embedded processor 102 allowing mission critical tasks to have a higher processing priority on the embedded processor. In other embodiments where connectivity to the remote processor 136 (for example a cloud processing system) may be sufficiently reliable to permit even some mission critical functions to be performed by the remote processor 136 where access to more powerful computing resources is desirable.

Fragmentation

Ore excavated in a mining operation is usually transported to a processing operation, where the ore is crushed, screened and otherwise processed. Efficient blasting, where employed, causes fragmentation of the ore and proper fragmentation analysis can help mining operators optimize blasting results to realize significant time and cost savings. Over-blasting results in excessive energy consumption and increases the cost of explosives, while under-blasting results in large fragmented rocks that overwork downstream equipment and shorten their lifespan. In some embodiments, the downstream processing may be optimized based on a degree of fragmentation of the ore being excavated. Fragmentation analysis using a neural network is described in commonly owned PCT patent publication WO 2017/100903 entitled METHOD AND APPARATUS FOR IDENTIFYING FRAGMENTED MATERIAL PORTIONS WITHIN AN IMAGE filed on Dec. 13, 2016 and incorporated herein by reference. Fragmentation analysis is computationally intensive and requires quite substantial processing resources. The embedded processor 102 may have limited processing power and performing fragmentation analysis using the microprocessor 200 may detract from mission critical processing operations such as missing tooth detection. In the embodiments disclosed herein, further processing to determine fragmentation of the payload 110 in the operating implement 106 is performed by the remote processor 136 on images transmitted to the remote processor by the embedded processor 102 at block 316 of the process 300.

Figure 16:
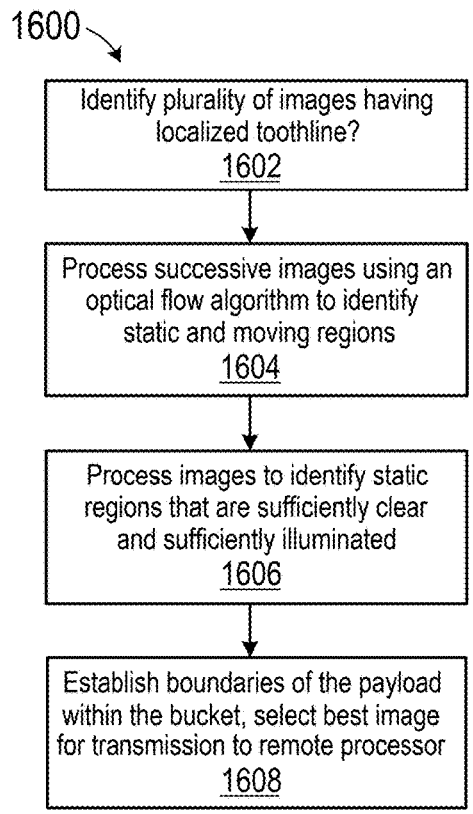
FIG. 16 is a is a process flowchart including blocks of codes for directing the processor circuit of FIG. 2 to identify image data suitable for further processing to determine fragmentation.
Figure 17:
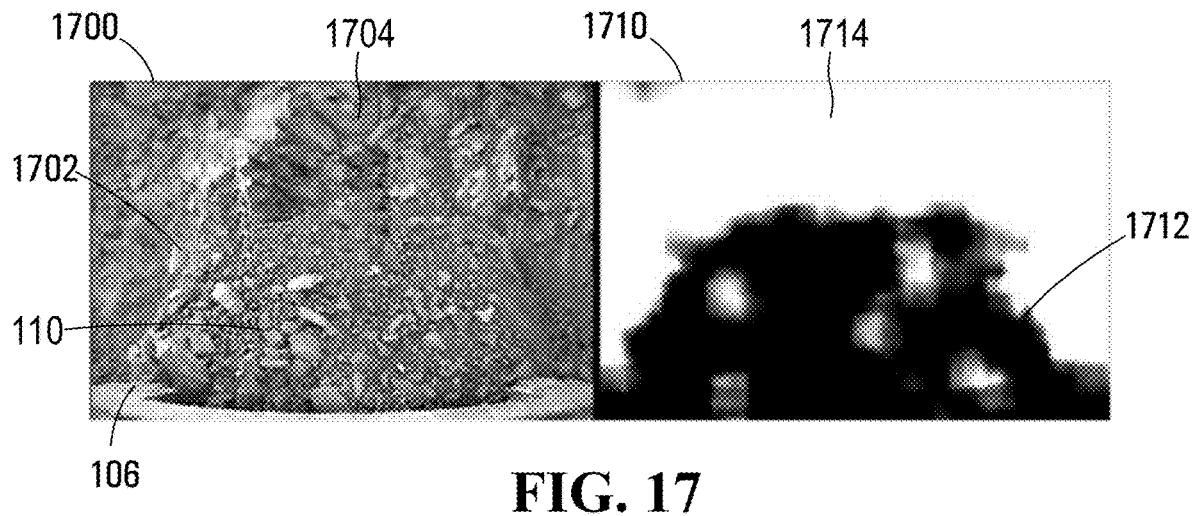
FIG. 17 is an image of an operating implement of the mining shovel shown in FIG. 1A and an output from an optical flow algorithm implemented on the embedded processor shown in FIG. 2.

A process implemented on the embedded processor 102 for designating images as being suitable for fragmentation analysis is shown in 1600 in FIG. 16. Referring to FIG. 16, the process begins at block 1602, which directs the microprocessor 200 to identify images in which the toothline 108 is at least partly visible. An example of a suitable image is shown in FIG. 17 at 1700, where a payload 110 of fragmented ore has been loaded into a bucket of the operating implement 106. Background ore 1704 may also be partly fragmented and is not easily distinguishable from payload 110. In one embodiment the neural network 600 may be used to identify these images generally in accordance with the process 800 shown in FIG. 8.

Block 1604 then directs the microprocessor 200 to process successive images initially identified as being suitable for fragmentation analysis using an optical flow algorithm to separate the payload 110, which will be generally static between images from the background 1704, which will move relative to the payload. Various optical flow algorithms have been established for segmenting image data based on processing sequences of images to detect static and moving features. Referring back to FIG. 17, an example of an optical flow algorithm is shown at 1710, where the mostly black regions 1712 are static payload 110 and other portions of the operating implement 106, while the white regions 1714 are the background 1704.

Block 1606 then directs the microprocessor 200 to further process the images to select images that have the necessary clarity for successful Fragmentation analysis. Block 1606 may be implemented using a neural network that is trained to determine whether the static regions identified at block 1604 represent filled payload and have sufficient lighting, are not shadowed by portions of the mining shovel 104, and do not have a surface layer of dust covering the payload. In one embodiment a neural network such as the network 600 may be trained to identify and categorize regions of interest within images as being suitable for fragmentation analysis (bucket full of payload 110), suitable for tooth wear monitoring (bucket empty), or as being part of the background. Images where the bucket is filled with payload 110, but have the payload partly obscured, poorly illuminated, or otherwise obscured may be categorized as being unsuitable for fragmentation analysis.

Block 1608 then directs the microprocessor 200 to establish boundaries of the payload within the operating implement 106. At block 1604 the optical flow algorithm will not be able to separate portions of the operating implement 106 from the payload 110 since both will be identified as being static with respect to the background 1704. Block 1608 may be implemented as a further neural network that is trained with labeled training images to separate the payload 110 from the structure of the operating implement 106 such as the casing and/or teeth so that these features are not taken into account in the subsequent fragmentation analysis. Block 1608 also directs the microprocessor 200 to select the best image within the timeframe of the operating cycle of the mining shovel 104 (for example best image within the last 5 minutes). The selected image is then transmitted to the remote processor 136 at block 316 of the process 300. The remote processor 136 performs the fragmentation analysis and generates fragmentation results such as rock size distribution graphs and size range statistics, which are transmitted back to the embedded processor 102 or to another processor as described earlier herein.

Fragmentation analysis may be processor intensive and when performed by the remote processor 136 has the advantage of offloading tasks from the embedded processor 102 to allow the embedded processor to prioritize mission critical tasks such as missing tooth detection.

Bucket Fill Percentage

A time taken by the operator to complete a full operating cycle of the mining shovel 104 in excavating and loading the payload 110 determines a loading efficiency for the shovel. An average operating cycle time for a hydraulic shovel may be about 30 seconds, 25% of which may be swing time for an empty operating implement, 41% to fill the operating implement, 24% being swing time for the full operating implement, and 10% to dump the payload in the haul truck 140. For example, if a 50 ton bucket of the operating implement 106 is less than full for each cycle, an additional operating cycle may be added to the typically 4 cycles required to fill a 200 ton haul truck. If however, obtaining close to 100% fill factor causes the operating cycle time to be extended, the elimination of the additional cycle may be negated. The bucket fill percentage may be dependent on particle size, operator skill, blasting efficiency, compaction provided by the shovel while excavating, and ore properties. Presenting a measurement of the fill percentage to the operator and/or other mine operating personnel may be valuable in having operators of shovels reach a near optimal efficiency.

In one embodiment a process similar to the process 1600 shown in FIG. 16 may be used to identify image data suitable for further processing to determine the fill percentage of the operating implement 106. In this embodiment an identified image or images are then transmitted to the remote processor 136 at block 316 of the process 300 and the remote processor 136 performs the fill percentage analysis. In one embodiment the identified images may be further processed using a neural network trained to output a bucket fill percentage for the particular payload 110. The determined fill percentage is transmitted back to the embedded processor 102 for display to the operator of the mining shovel 104 or to another processor at the mine for display to other operating personnel.

The above disclosed embodiments have the advantage of providing a depth of information to a mine operator or shovel operator that if performed only on an embedded processor on the shovel would require significant processing power, thus increasing the complexity and cost of the on-shovel system. The offloading of some processing tasks from the embedded processor, allows the on-shovel system to focus on capturing images, designating the images as being critical or non-critical and placing a priority on processing critical image data to provide near real-time results to the shovel operator of the most important mission critical determinations made by the system.

While specific embodiments have been described and illustrated, such embodiments should be considered illustrative of the invention only and not as limiting the invention as construed in accordance with the accompanying claims.

What is claimed is:

1. A computer processor implemented method for monitoring a condition associated with operating heavy equipment, the method comprising:
   receiving a plurality of images at an interface of an embedded processor disposed on the heavy equipment, each of the plurality of images providing a view of at least an operating implement of the heavy equipment;
   processing each of the plurality of images using a first neural network implemented on the embedded processor, the first neural network having been previously trained to identify regions of interest within the plurality of images, each region of interest having an associated designation as at least one of:
      a critical region suitable for extraction of critical operating condition information required for operation of the heavy equipment; and
      a non-critical region suitable for extraction of non-critical operating condition information associated with the operation of the heavy equipment;
   causing the embedded processor to initiate further processing of image data associated with critical regions to generate local output operable to alert an operator of the heavy equipment of the associated critical operating condition;
   transmitting image data associated with non-critical regions to a remote processor, the remote processor being operably configured for further processing of the image data and to generate output signals representing results of the further processing; and
   receiving the output signals generated by the remote processor at one of the embedded processor or another processor associated with a heavy equipment operations worksite, the output signals being presentable via an electronic user interface based at least in part on said output signals to indicate the results of the further processing.

2. The method of claim 1 wherein for each region of interest, the first neural network is operably configured to produce a probability map including a probability of each image pixel or group of pixels in a respective image in the plurality of images being associated with a particular region of interest and further comprising:
   causing the embedded processor to perform a correlation between the probability map and a template associated with the particular region of interest, the template including information based on a physical extent and shape of an object within the region of interest; and
   in response to determining that the correlation between the probability map and the template meets a criterion, causing the embedded processor to identify a portion of the image corresponding to the template for further processing.

3. The method of claim 2 wherein determining that the correlation between the probability map and the template meets a criterion comprises:
   selecting successive portions of the probability map based on the template;
   computing a correlation value for each successive portion; and
   identifying the portion of a respective image in the plurality of images for further processing based on identifying one of the successive portions of the probability map that has a maximum correlation value that also meets the correlation criterion.

4. The method of claim 1 further comprising training the first neural network to identify regions of interest by:
   (a) performing a first training of a neural network having a first plurality of interconnected neurons using a first plurality of labeled images of critical regions and non-critical regions, each neuron having a respective weighting;
   (b) evaluating performance of the neural network based on results obtained for processing of a second plurality of labeled images;
   (c) pruning neurons having a weighting below a pruning threshold to produce a pruned neural network having a second plurality of interconnected neurons;
   (d) re-evaluating the performance of the pruned neural network having the second plurality of interconnected neurons based on results obtained for processing the second plurality of labeled images; and
   (e) repeating (c) and (d) while pruning neurons has an acceptable effect on the performance of the neural network, and wherein the pruned network having the reduced number of neurons is used to implement the first neural network on the embedded processor.

5. The method of claim 4 wherein evaluating performance of the neural network and re-evaluating performance of the pruned neural network is based on computing a cost function that accounts for increased processing speed of the pruned neural network and reduced accuracy in producing the labeled result associated with the previously labeled training images.

6. The method of claim 1 wherein processing each of the plurality of images comprises processing the plurality of images to identify as a critical region, one of:
   a wear part region of the operating implement for performing missing wear part detection; and
   a payload region within the operating implement for performing boulder detection.

7. The method of claim 1 wherein processing each of the plurality of images comprises processing the plurality of images to identify as a non-critical region, one of:
   a wear part region of the operating implement for determining a wear rate associated with a wear part;
   a payload region within the operating implement for performing fragmentation analysis on the payload; and
   a bucket region of the operating implement for determining a bucket fill proportion.

8. The method of claim 1 wherein processing each of the plurality of images comprises processing each of the plurality of images to identify as a critical region, one of:
a vehicle appearing within the image at a location designated as a danger zone; and
a component associated with manipulation of the operating implement appearing outside of an operational zone associated with the operating implement.

9. The method of claim 1 wherein causing the embedded processor to process images identified as being suitable for extraction of critical operating condition information comprises processing the identified images using a second neural network that has been previously trained to extract the critical operating condition information from the region of interest.

10. The method of claim 9 wherein processing the identified images using a second neural network comprises processing the identified images using a convolutional neural network having a sparse kernel.

11. The method of claim 1 wherein processing each of the plurality of images comprises processing the plurality of images to identify a wear part region of the operating implement as a critical region and wherein causing the embedded processor to initiate further processing comprises causing the embedded processor to process image data corresponding to the wear part region using a second neural network that has been previously trained to identify wear components of the wear part.

12. The method of claim 11 wherein the second neural network is operably configured to produce a probability map including a probability of each image pixel or group of pixels in a respective image in the plurality of images being associated with a wear component and further comprising:
causing the embedded processor to perform a correlation between the probability map and a wear component template including information based on a physical extent and shape of the wear component; and
in response to determining that the correlation between the probability map and the wear component template meets a criterion, causing the embedded processor to identify individual wear components of the wear part.

13. The method of claim 11 further comprising causing the embedded processor to locate a tracking feature associated with each identified wear component in the image data and further comprising causing the embedded processor to issue a missing wear component alert when the tracking feature changes location between subsequent images by more than a missing wear component threshold.

14. The method of claim 13 wherein the wear part comprises a toothline and wherein the wear components comprise respective teeth in the toothline and wherein the tracking feature comprises a tip of respective teeth.

15. The method of claim 14 further comprising causing the embedded processor to:
identify a reference tooth within the plurality of teeth and to generate a tracking feature trajectory for the reference tooth over successive images in the plurality of images;
determine conformance of the tracking feature trajectory between successive images to validate identification of the reference tooth;
in response to validating identification of the reference tooth, identifying remaining teeth in a respective image in the plurality of images relative to the reference tooth to uniquely identify each tooth in the respective image; and wherein causing the embedded processor to issue a missing tooth alert comprises causing the embedded processor to issue a missing tooth alert uniquely identifying the tooth associated with the tracking feature change in location by more than the missing tooth threshold.

16. The method of claim 15 further comprising causing the embedded processor to save location information associated with the tracking feature and wherein causing the embedded processor to issue a missing tooth alert comprises causing the embedded processor to issue a missing tooth alert in response to determining that the tracking feature has changed location by more than the missing tooth threshold in successive images.

17. The method of claim 15 further comprising causing the embedded processor to save location information associated with the tracking feature and in response to determining that the tracking feature trajectory in successive images has changed location by less than the missing tooth threshold, updating the saved location information based on the changed location.

18. The method of claim 1 wherein processing each of the plurality of images comprises causing the embedded processor to process images to identify regions meeting a criterion for successful determination of wear status of the wear part of the operating implement as non-critical regions and transmitting image data corresponding to the identified regions to the remote processor for further processing to monitor a wear rate of the wear part.

19. The method of claim 18 wherein causing the embedded processor to transmit selected images comprises causing the embedded processor to:
use a neural network that has been previously trained to assign a probability to pixels in a respective image in the plurality of images including a wear landmark, a generally contiguous group of pixels having a higher assigned probability being indicative of the group of pixels being associated with the wear landmark; and
determine that the criterion for successful determination of wear status of the wear part is met when an image includes a minimum number of groups of pixels having high probability of including a wear landmark.

20. The method of claim 18 wherein the wear part comprises a toothline having a plurality of teeth and further comprising causing the remote processor to further process images transmitted by the embedded processor by:
processing the plurality of images using a neural network that has been previously trained to assign a probability to pixels in a respective image in the plurality of images including wear landmarks, a generally contiguous group of pixels having a higher assigned probability being indicative of the group of pixels being associated with the wear landmark; and
processing selected images using a second neural network that has been previously trained to assign a probability to pixels in the respective image being associated with a tooth, a generally contiguous group of pixels having a higher assigned probability being indicative of the group of pixels being associated with the tooth.

21. The method of claim 20 wherein the further processing further comprises generating at least one of a wear rate, wear pattern, and an estimated service lifetime for each tooth in the plurality of teeth by determining tooth condition as a function of operating time of the heavy equipment.

22. The method of claim 20 wherein the further processing further comprises generating a confidence level associated with each tooth condition determined during the further processing, the confidence level being based on a number of wear landmarks associated with the tooth that are identified in the respective image.

23. The method of claim 20 wherein the wear landmark comprises a portion of the operating implement that wears at a lesser rate during operation of the heavy equipment than the plurality of teeth.

24. The method of claim 1 wherein processing each of the plurality of images comprises:
  causing the embedded processor to select images from the plurality of images using the first neural network that has been previously trained to assign a probability to pixels in a respective image in the plurality of images being associated with a payload carrying operating implement, the selected images being selected based on inclusion of a generally contiguous region having a higher assigned probability indicative of a payload, the selected images being representative of movement of the operating implement while performing a loading operation;
  processing the plurality of images to distinguish the payload from a background region in the respective image by processing successive images to identify static image portions that remain substantially unchanged between successive images, the static image portions having a higher likelihood of being associated with the payload; and
  wherein transmitting image data associated with non-critical regions to a remote processor comprises selecting at least one suitable image and transmitting the selected image to the remote processor for further processing at the remote processor using a second neural network to identify fragmented material portions of the payload within the static image portions.

25. The method of claim 1 wherein receiving the plurality of images comprises receiving images from one of:
  an image sensor having primary sensitivity to visible wavelengths; and
  an image sensor having sensitivity to infrared wavelengths.

26. The method of claim 1 wherein receiving the plurality of images comprises receiving images from a pair of spaced apart image sensors operable to generate three-dimensional information representing objects within view of the image sensors.

27. The method of claim 26 wherein processing the plurality of images comprises processing the images to determine three-dimensional depth information associated with pixels in the plurality of images and wherein the identifying of regions of interest is based on the three-dimensional depth information.

28. The method of claim 26 wherein transmitting image data to the remote processor comprises transmitting three-dimensional image data to the remote processor for use in determining sizing of objects within view of the image sensors.

29. A system for monitoring a condition associated with operating heavy equipment, the system comprising:
  an embedded processor disposed on the heavy equipment having an interface for receiving a plurality of images, the plurality of images providing a view of at least an operating implement of the heavy equipment, the embedded processor being operably configured to process each of the plurality of images using a first neural network, the first neural network having been previously trained to identify regions of interest within the plurality of images, each region of interest having an associated designation as at least one of:
    critical regions suitable for extraction of critical operating condition information required for operation of the heavy equipment; and
    non-critical regions suitable for extraction of non-critical operating condition information associated with the operation of the heavy equipment;
  wherein the embedded processor is operably configured to initiate further processing of image data associated with critical regions to generate local output operable to alert an operator of the heavy equipment of the associated critical operating condition;
  a transmitter in communication with the embedded processor and being operably configured to transmit image data associated with non-critical regions to a remote processor, the remote processor being operably configured for further processing of the image data and to generate output signals representing results of the further processing; and
  wherein output signals generated by the remote processor are received at one of the embedded processor or another processor associated with a heavy equipment operations worksite, the output signals being presentable via an electronic user interface based at least in part on said output signals to indicate the results of the further processing.

* * * * *